INVENTOR.
WILLIAM McK. MARTIN

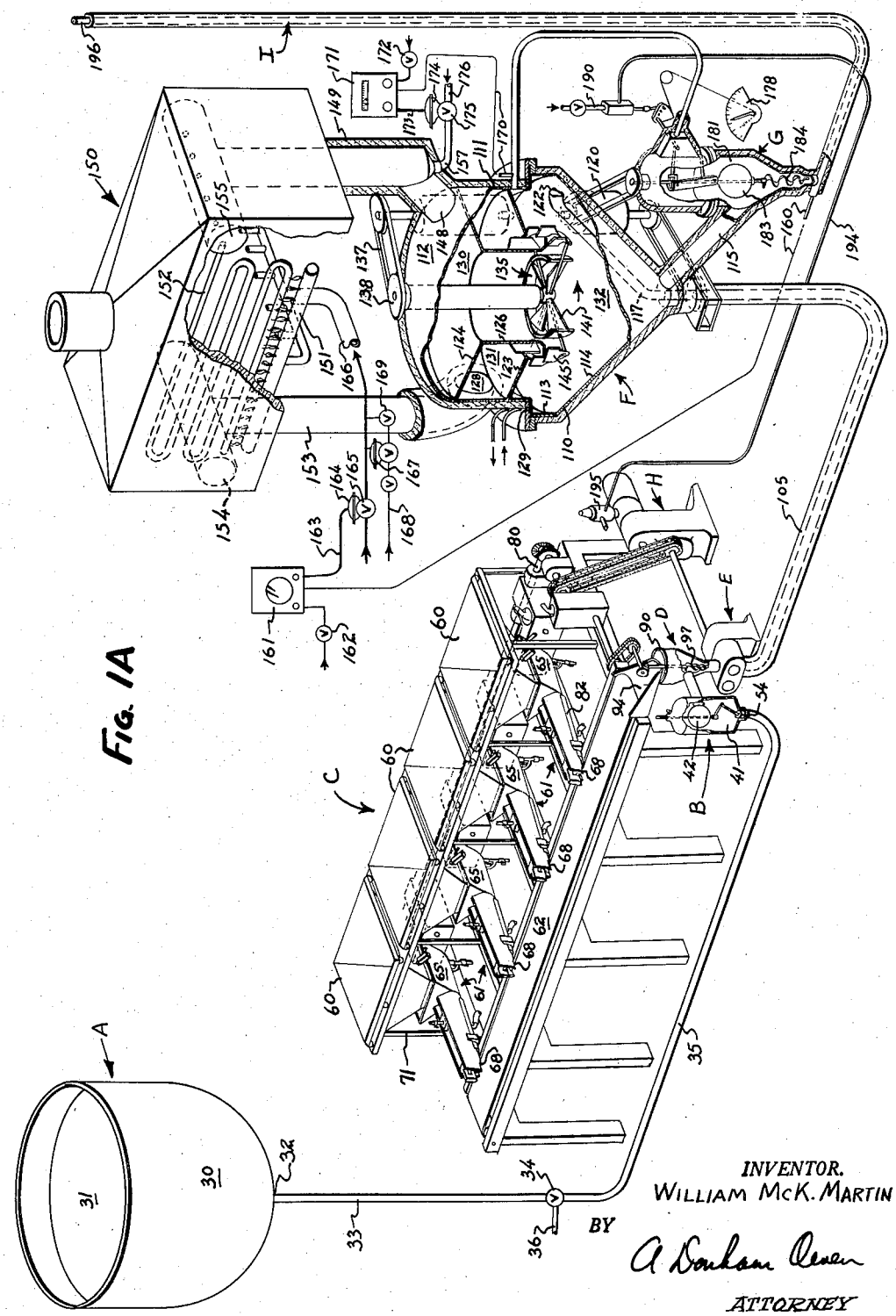

INVENTOR.
WILLIAM McK. MARTIN
ATTORNEY

June 26, 1962 W. McK. MARTIN 3,041,185
ASEPTIC CANNING
Filed Oct. 12, 1959 14 Sheets-Sheet 4
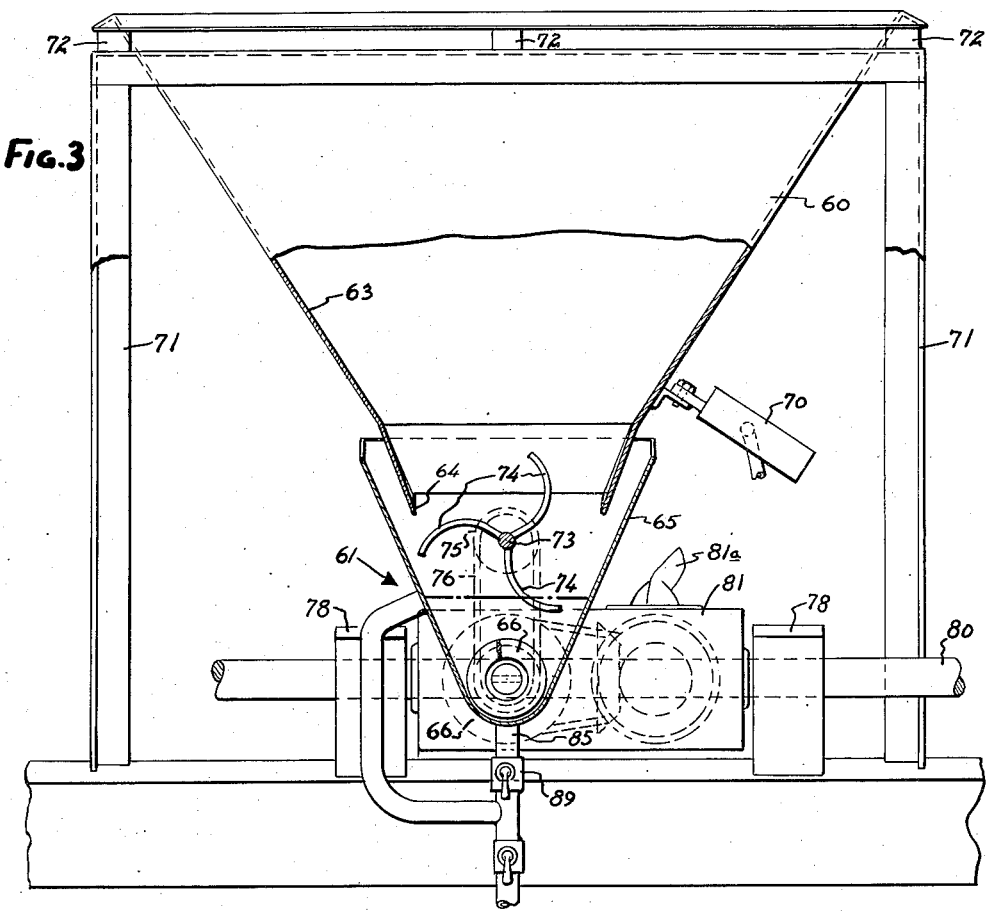
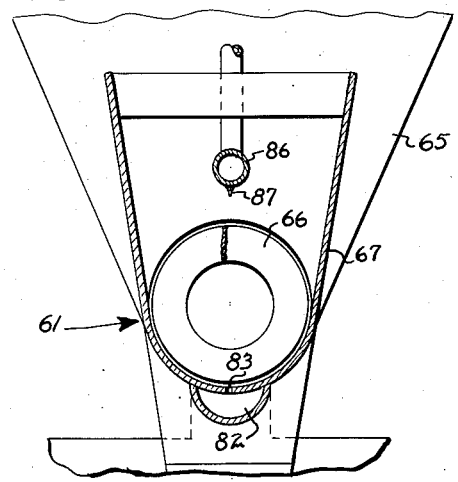
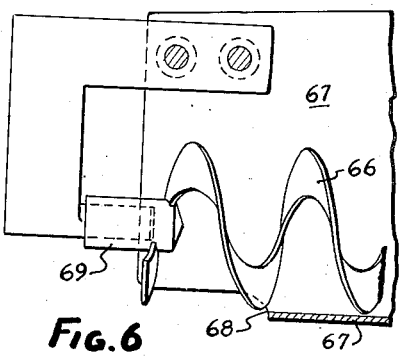
INVENTOR.
WILLIAM McK. MARTIN
BY
ATTORNEY

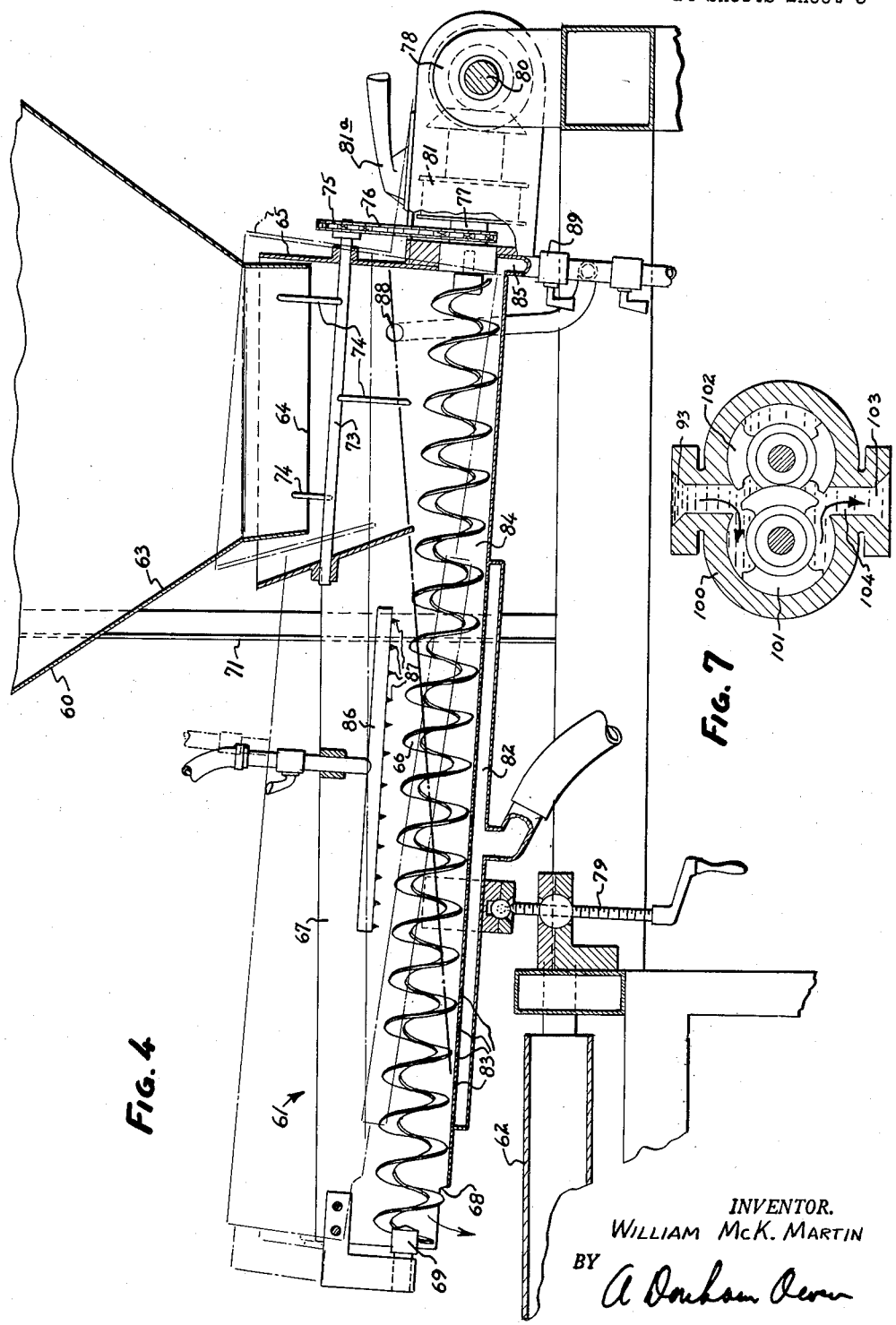

June 26, 1962  W. McK. MARTIN  3,041,185
ASEPTIC CANNING
Filed Oct. 12, 1959  14 Sheets-Sheet 7
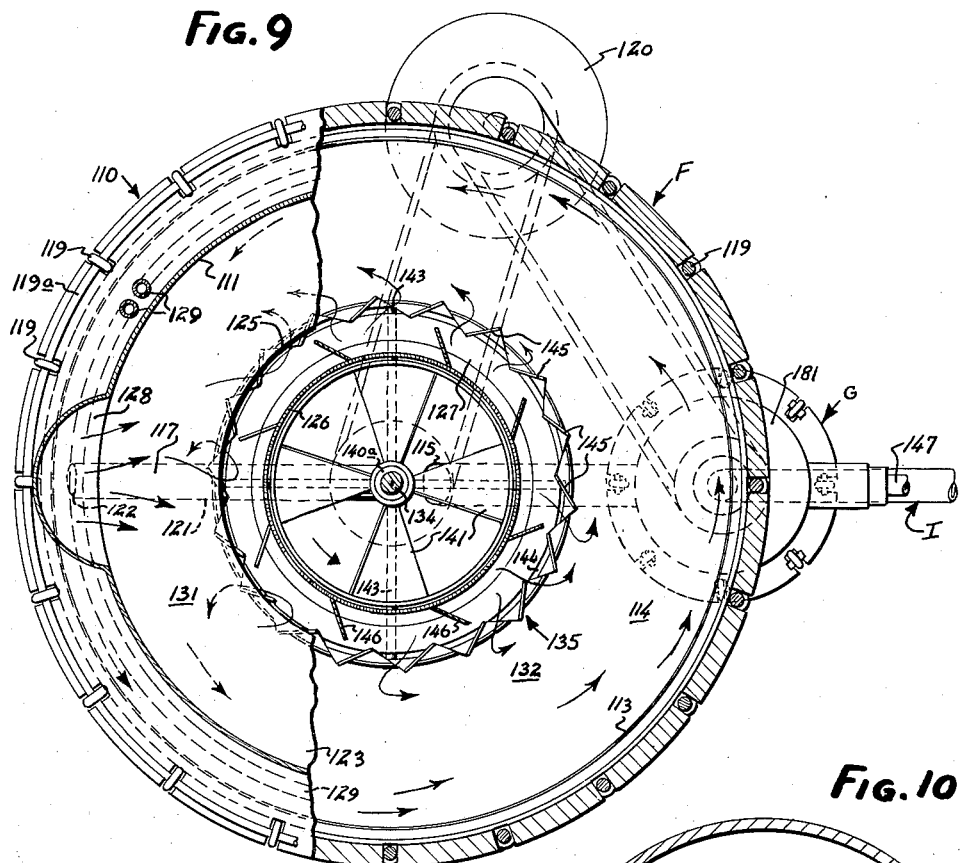
INVENTOR.
WILLIAM McK. MARTIN
BY
ATTORNEY INVENTOR.
WILLIAM McK. MARTIN June 26, 1962

W. McK. MARTIN
ASEPTIC CANNING 3,041,185

Filed Oct. 12, 1959

INVENTOR.
WILLIAM McK. MARTIN
BY
*A. Dunham Owen*
ATTORNEY

INVENTOR.
WILLIAM McK. MARTIN

June 26, 1962 W. McK. MARTIN 3,041,185
ASEPTIC CANNING
Filed Oct. 12, 1959 14 Sheets-Sheet 12

INVENTOR.
WILLIAM McK. MARTIN
BY
ATTORNEY

June 26, 1962 W. McK. MARTIN 3,041,185
ASEPTIC CANNING
Filed Oct. 12, 1959 14 Sheets-Sheet 13

INVENTOR.
WILLIAM McK. MARTIN
BY
A. Dunham Oliver
ATTORNEY

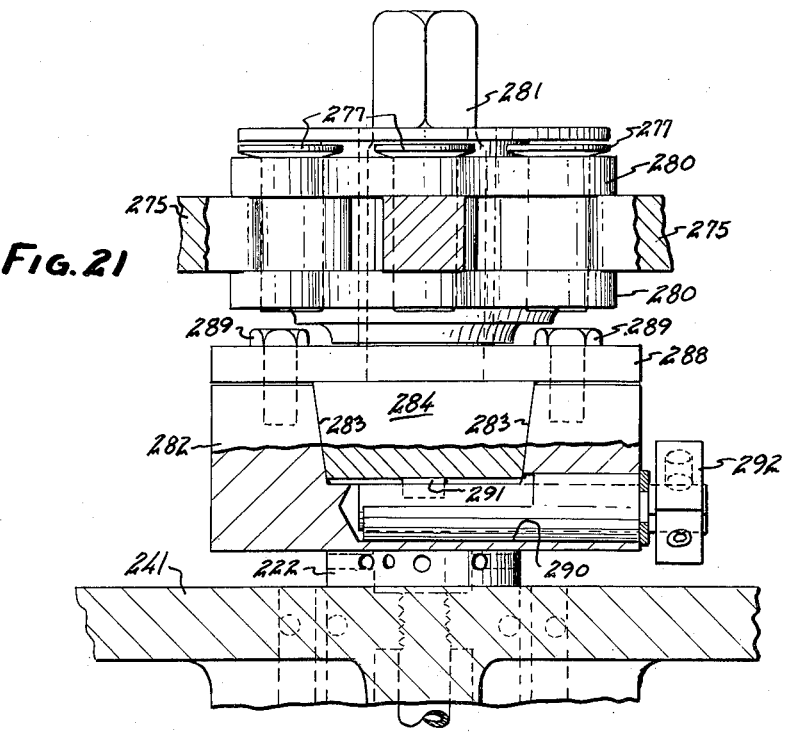
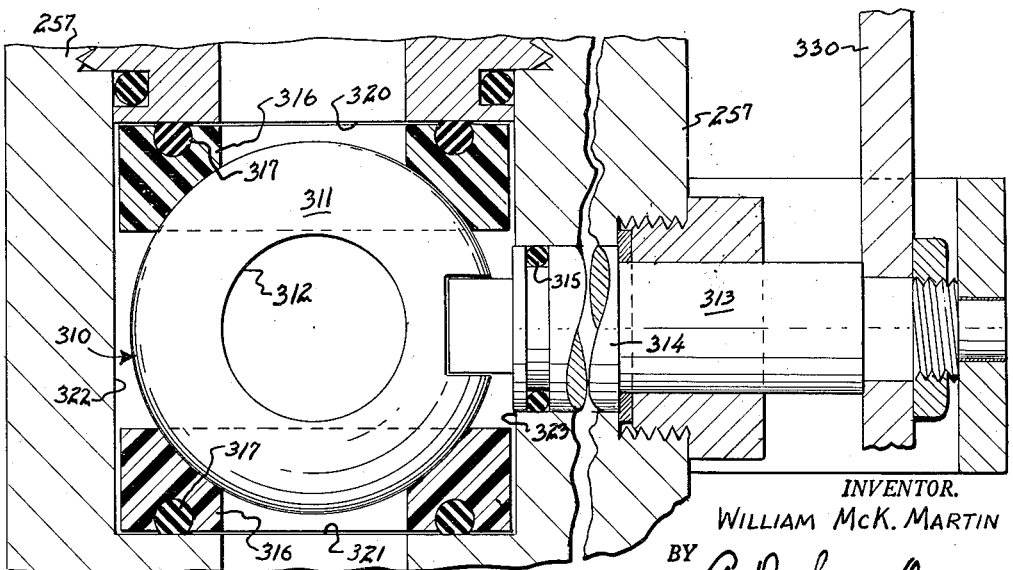

United States Patent Office 3,041,185
Patented June 26, 1962

3,041,185
ASEPTIC CANNING
William McK. Martin, 457 Virginia Ave.,
San Mateo, Calif.
Filed Oct. 12, 1959, Ser. No. 845,744
13 Claims. (Cl. 99—182)

This invention relates to method and apparatus improvements for use in aseptic canning systems. It relates especially to the aseptic canning of foods containing suspended solids, such as vegetable soup, beef stew, and the like. The invention comprises a substantially complete process in which presized solid pieces of food are blanched and fed in metered amounts into a liquid phase of the food product and are mixed with it. Short-time, high-temperature sterilization is employed in a novel manner. The sterilized food is then cooled and dispensed into cans by a novel filler. The invention includes unusual coaction between several different parts of the complete system.

The invention also incorporates novel features in many of the elements themselves. Thus, it relates, as well, to an improved method and improved apparatus for metering and blanching sizable particles of food; an improved apparatus for mixing the solid components with metered amounts of a liquid foodstuff, an improved method and apparatus for sterilizing them in a short time at elevated temperatures, and an improved method and apparatus for filling the products into presterilized containers under aseptic conditions.

This application is a continuation-in-part of my application Serial Number 759,098, filed September 4, 1958, now abandoned, which was a continuation-in-part of my application Serial Number 546,306, filed November 14, 1955, now abandoned.

A very important object of the present invention is to prevent disintegration, attrition, or mushing of the solid components in the food product while assuring their accurate measurement, their blanching, their complete sterilization, and their accurate and rapid filling into the presterilized containers.

Another important object of the invention is to provide for the continuous production of canned fluid or semi-fluid food products containing solid pieces and having better flavor, color, texture, and uniformity than can be produced by conventional canning methods. The invention can also be used to produce homogeneous liquid and semiliquid canned products of improved quality.

Although the apparatus and methods of this invention will be described in connection with an aseptic canning system, many features are useful elsewhere in other food and chemical processing systems; so the invention is not to be interpreted as confined too narrowly.

THE ASEPTIC CANNING PROCESS CONSIDERED GENERALLY

The aseptic canning process differs from conventional canning methods in that the product to be canned is sterilized before it is sealed in the containers, or even put into them, whereas in the conventional methods, the product is first put into the containers and sealed, and then the sealed containers are heated in a pressure cooker or retort to sterilize the product. In aseptic canning, the product is quickly heated to an elevated temperature in the range of 275–300° F., is maintained at that temperature for sufficient time to effect sterilization, and is then rapidly cooled to 90–110° F.; the cooled sterile product is filled into presterilized containers in a sterile atmosphere, and the containers are sealed with sterile covers while still in the sterile atmosphere.

The heat-treatment received by the product in the sterilization step of the aseptic canning method is a matter of seconds, as compared with minutes in the conventional canning methods. For example, the conventional in-can sterilization process for green split pea soup in 303 x 406 cans (16-oz. size) comprises heating the sealed can of soup for 55 minutes at a temperature of 250° F. In comparison, the aseptic canning method achieves sterilization of the same product before filling by holding it for only 8.8 seconds at 286° F. In the process of this invention, it takes only one or two seconds to heat the soup to 286° F., for a total heating time of about ten or eleven seconds to effect sterilization.

While the short-time, high-temperature sterilization process of this invention provides for continuous high-speed aseptic canning with more precise automatic control and consequent savings in labor and heat-energy, these savings and this speed are not its only advantages. Equally important is the fact that the finished canned product has better flavor, color, texture and vitamin content than the product resulting from lower temperature sterilization.

This outstanding improvement in quality is due to the fact that the lethal effect of heat upon bacterial spores increases at a very much higher exponential rate with increasing temperature than do the chemical changes that cause the degradation of flavor, color, texture and vitamin constituents of the product. In fact, the sterilizing effect or lethality, time being constant, increases tenfold while the chemical reactions responsible for degradation of food quality increase only twofold with each increase in 18° F. in process temperature. Some idea of the importance of this interesting relationship can be grasped by remembering that $2^4$ is 16, while $10^4$ is 10,000.

QUANTITATIVE EVALUATION OF LETHALITY

The quantitative evaluation of lethality, or the sterilizing effect, of short-time, high-temperature processes for canned foods is expressed in the formula (given in the National Canners Association Laboratory Manual for the canning industry, 2nd edition, chapter 12, page 37):

$$F_0 = \frac{S}{60} 10^X$$

where $$X = \frac{T-250}{z}$$

$S$=the time in seconds during which the product is held at a process temperature $T$,
$T$=the temperature in ° F. of the product during the process time $S$, and
$z$=the slope of the thermal death-time curve in ° F., which for most of the common low-acid food products has been found to be 18° F.

In the above formula, 250° F. is taken as a standard reference temperature, and the sterilization value $F_0$ is expressed as time in minutes at this temperature. The sterilization values ($F_0$) are thus expressed on a comparable basis, regardless of the actual process temperature.

To illustrate the practical significance of the quick, high-temperature sterilization process used in the present invention, let us see how temperature affects the "minimum botulinus cook," i.e. what it takes to kill the dangerous bacterium, *Clostridium botulinum*. For the destruction of its heat-resistant spores $F_0=4$. A 100 percent margin of safety would be given by using $F_0=8$. Now compare the times necessary for equivalent sterilization processes at various temperatures, shown in the following table:

*Relation of Temperature and Time in Equivalent Sterilization Processes of* Clostrodium botulinum, *at* $F_0=8$

| Process Temperature T, °F. | Process Time S, minutes |
|---|---|
| 214 | 800. |
| 232 | 80. |
| 250 | 8. |
| 268 | 0.8 (48 seconds). |
| 286 | 0.08 (4.8 seconds). |
| 304 | 0.008 (0.48 seconds). |

Thus, a few seconds in the higher temperature range are equivalent to many minutes at lower temperatures; and this short-time sterilization of foods at high temperatures does not degrade the food quality, as lower temperature sterilization does.

PROBLEMS IN QUICKLY HEATING FOODS TO BE CANNED ASEPTICALLY

There are, however, many difficulties involved in quickly heating food products to temperatures of 275–300° F. Scorching and local overheating of the product at the heat-exchange surfaces in the heater are difficult to avoid—almost impossible when using most conventional heaters. Also, the solid components of the product tend to be disintegrated or mushed by their movement throught the heater and other parts of conventional processing equipment.

Food products, being of organic composition, are very heat sensitive; they readily adhere to, and form crusts or films on, the hot surfaces of the types of heat-exchangers heretofore known. Local overheating or scorching of solid material that adheres to the heat-exchange surface not only imparts a cooked or burnt flavor and an objectionable color to other parts of the product contacting it in movement through the heater; in addition, burnt-on or heat-congealed film on the heat-exchange surface markedly reduces the efficiency of heat-transfer.

If the product to be processed contains suspended solids of a frangible nature, the problems of heating and handling through the processing equipment are even more difficult.

Of the various types of heat exchangers commercially available for use in the food industry, none has been found satisfactory for short-time, high-temperature processing of the solids-containing products mentioned above, as the following comments will illustrate:

(1) When tubular heat exchangers are used for heating heat-sensitive products to temperatures in the range of 250–300° F., high velocity flow must be maintained in the heating tube in order to reduce burn-on or filming of product on the hot surface of the tube. For example, in the quick, high-temperature sterilization of ready-to-serve (not condensed) green split pea soup, the soup is pumped continuously through a steam-jacketed ⅜″ O.D. (0.305″ I.D.) stainless steel tube at a velocity of 29.5 feet per second. The pump pressure required to maintain this velocity through the heating tube and other parts of the system is in the range of 2,600 to 2,800 p.s.i. Even then, burn-on occurs and reduces the efficiency of heat transfer to the extent that the heating tube must be cleaned with suitable detergents at approximately two-hour intervals during operation.

The amount or rate of burn-on or filming will, of course, vary according to the nature and composition of the product being heated. For example, in processing tomato soup with the same equipment and under the same temperature and velocity conditions, burn-on occurs so rapidly that the heating tube must be cleaned after about each 30 minutes' operation. Thus tubular heaters have disadvantages even with homogeneous liquid food products.

More important, tubular heaters can not be used at all for high-temperature processing of foods containing suspended solid components. Obviously, it would not be possible to pump or otherwise convey solid components through small-diameter tubes, and even if it were possible to do so, the solid components would be completely disintegrated by attrition during high-velocity flow through the small-diameter heating tubes. Large-diameter tubes give insufficient heat-exchange surfaces, and the pumps necessary for turbulent flow of the large volumes involved and over the tremendous lengths that would be required, are unobtainable and if obtained, would pulverize the solids.

Tubular heaters also cannot be used for processing viscous products, such as condensed soups, because impracticably high pump pressures would be necessary to force such products through the heating tube at sufficiently high velocity to reduce burn-on to an acceptable level in commercial operations.

(2) Plate heaters are widely used in heating and cooling nonviscous liquids in the lower temperature range of 140–200° F. Plate heaters are used mostly in the dairy industry for heating and cooling milk and milk products of low viscosity, using hot water or saturated steam at subatmospheric pressures to avoid burn-on or scorching of the product as it flows at low velocity over the heat-exchange surfaces.

However, in the high-temperature sterilization required in aseptic canning, plate heaters are subject to the same basic objection as tubular heaters: burn-on can be avoided only by high velocities. Furthermore, plate heaters are too weak to withstand the pressures necessary to obtain high-velocity flow of the product, and the narrow clearances between plates preclude their use in processing foods that are to retain their solid components as solid pieces.

(3) Heat exchangers with rotary scrapers have been used for heating liquiform food products to temperatures in the range of 250–300° F., and cooling them to any desired temperature. A typical machine has a steam-jacketed heat-transfer cylinder about 6 inches in diameter and 48 inches long in which is mounted a rotating shaft carrying scraper blades, which not only agitate and stir the product in contact with the heat-exchange surface, but also scrape the surface to remove encrusted or burnt-on material. The rotating shaft and blades mechanically damage and cause attrition of solid components. The damage is particularly objectionable when the liquid phase of the food product is of low viscosity, for the solid components are then partially disintegrated or mushed and also tend to build up in between the blades and the heat-exchange surface. In any event, heat transfer is inefficient.

Moreover, the rotary scraper type of heat exchanger cannot be used at all for quick high-temperature processing in the range of 275–300° F. of particulate products of thick or heavy consistency, such as condensed vegetable soup, beef stew and similar products. This inability is due not only to the objectionable disintegration and attrition of the solid components, but also to the low efficiency of heat transfer and to the difficulties of moving products of this type through the heating and cooling cylinder.

(4) Steam-injection heaters embody the principle of injecting steam directly into the liquid being heated, high-pressure steam being dispensed from nozzles or orifices. Typical examples are:

(a) In simple nozzle-type steam-injection heaters, steam is discharged directly into the body of liquid either in an open vessel or into the liquid as it flows continuously through a pipe.

(b) In tangential steam-injection heaters, steam orifices are positioned around the outside wall of a circular heating chamber so that the steam is discharged tangentially into the liquid as it flows continuously through the chamber. Compare the Peebles Patent No. 2,452,260 and the Gressly Patent No. 2,682,827.

(c) In combination steam-injection and mechanical-agitation heaters, the liquid is agitated or whirled at high velocity while steam is being injected into the rapidly moving liquid. Compare the De Bethune Patent No. 2,077,227 and the Hawk Patent No. 2,492,635.

(d) Combination steam-injection and steam-chamber heaters inject or mix steam with the liquid and then separate the excess or uncondensed steam from the liquid in a closed chamber. Compare the Hawk Patent No. 2,801,087.

Numerous disadvantages attend these apparatus. Temperatures and pressures are difficult to control owing to "surging" in the steam-injection apparatus. Product incrustation or burn-on forms on the nozzles or at the orifices bathed by or immersed in the product; it also forms on any of the hot metal surfaces in contact with the product. It is impractical to recirculate and reuse the same steam over extended periods of time. All such heaters mix the steam with the liquid to be heated; this in itself violently agitates the liquid, and agitation is highly objectionable in heating liquids containing suspended solid food.

In steam-injection heaters, either the steam is dispersed in the liquid or the liquid is dispersed in the steam, or there is a combination of both types of dispersions. When steam is dispersed in the liquid, the steam bubbles that are surrounded momentarily by liquid condense quickly in the liquid, resulting in a violent collapse of the bubbles and consequent violent agitation. Suspended solids present in the liquid (as in particulate food products like vegetable soup) are damaged or partially disintegrated by the agitation effect of the dispersed steam. If, on the other hand, the liquid product is dispersed in and mixed with the steam, the solid components are damaged or partially disintegrated in the mechanical dispersion and mixing of the product with the steam.

All of the above methods of heat-processing foods have been investigated by actual experimentation and none of them has been found satisfactory for use in the quick high-temperature sterilization of food products containing frangible solid components.

SOME CHARACTERISTICS OF THE HEATER OF THIS INVENTION

The present invention avoids mechanical damage and disintegration of solid components of foods by gently flowing the liquid-solid food mixture in a quiescent state and in a relatively thin layer with only its surface in contact with superheated steam, which sweeps the surface at high velocity. The food being heated and the steam heating medium are thus maintained as two separate and distinct phases, without intermixing. The gently moving quiescent mixture is quickly heated, while violent agitation of the product and the consequent disintegration of solid components are avoided.

It is thus an object of the present invention to provide a method for efficiently heating a fluid product to any desired temperature without scorching thereof, and without product burn-on or incrustation on any heat-exchange surface.

A further object of the invention is to transfer heat to a continuously flowing, partly liquid food product from a heated gas passing rapidly over an exposed surface of the product. The resulting gas-liquid interface provides the heat exchange and eliminates the need of metal heat-exchange surfaces.

Another object of the invention is to provide heat exchange between a hot gaseous or vaporous heat-exchange medium in the turbulent state and a gently flowing, cooler, product.

Another object is to avoid inefficient insulating layers which would be present in case of laminar flow of either the liquid or gas.

Yet another object of my invention is to provide a method and apparatus for uniformly heating homogeneous liquids or liquids containing sizable solid components, with controlled dilution or concentration.

THE NECESSITY OF STERILIZING THE PRODUCT BEFORE PUTTING IT IN THE CAN

High-temperature sterilization cannot be done after the product has been put in the can because of the slow rate of heat transfer from the outside to the interior of the product and because of control difficulties. The volumes and cross-sectional areas in cans are so large that when a peripheral portion is heated to 300° F., the inside center remains below the sterilization temperature long after sterilization has been completed at the peripheral portion and after prolonged heating has already begun degradation of the peripheral portion.

With viscous products in which heat transfer is by conduction and not by convection, high processing temperatures can not be used after the product is in the can because of excessive scorching of the product in contact with the excessively hot can walls. Furthermore, even with nonviscous or low-viscosity liquid products, as well as particulate-type products such as whole kernel corn in brine and peas in brine, in which the heat transfer is largely by convection, high-temperature processes can not be used satisfactorily after the product is in the can, because of the difficulties of accurately controlling the short process times required in the high-temperature ranges. Another difficulty is that the head space or fill of the can affects the degree of agitation of the product in the can, and if the can is overfilled, the reduction in headspace is reflected in less effective heat transfer; consequently, there is danger of understerilization with a consequent hazard of spoilage of the finished canned product.

In this invention, the high-temperature sterilization step precedes the filling step. The product is spread out in a thin layer and quickly brought to the sterilization temperature. Subsequently, the sterile food is cooled and is filled and sealed in the cans at the relatively cool temperature of about 90–110° F. That means that the already-sterilized food has to be put into already-sterile cans and sealed by already-sterile covers. It also means that the sterility of the cans and food must be maintained and protected before, during, and after the filling operation.

UNSUITABILITY OF PRIOR-ART FILLERS FOR ASEPTICALLY CANNING PARTICULATE FOODS

An important object of this invention is to provide a filling machine that can be conveniently operated under completely sterile conditions. Fillers already on the market can accomplish that object for some foods, but none of them has been suited to what I call "particulate foods," i.e., foods containing actual pieces of solid food material. For example, vegetable soup may contain whole peas and beans, diced potatoes, carrots, and pieces of celery. Beef stew would contain chunks of beef, diced potatoes and carrots, and so on. Filling machines capable of aseptically canning non-particulate liquid products have been unable to accommodate such gross pieces without chewing or pulping them into a practically homogenized slurry. Friction between the food and the edges of the machine or even friction between the food particles wears down the particles by attrition. Moreover, in some machines, the valves have been rendered inoperative or even damaged by the accumulation of such particles; in other machines the particles have been broken up, mashed, and destroyed as individual particles by the valves. Since we eat with our eyes and by feel as much as with our palate, such foods are not acceptable and nullify a basic object of aseptic canning—which is to distribute to consumers canned food substantially identical to what a good chef or cook would serve directly from his kitchen.

Accordingly, another important object of the invention is to provide a filler capable of use with particulate foods without damage to the solid components and without adversely affecting operation of the filler. However, the filler's utility is not, of course, limited to particulate foods or even to foods at all, or to sterile processes. The point is that this filler is of especial utility in those fields.

THE IMPORTANCE OF MAINTAINING BACK-PRESSURE IN THE ENTIRE PROCESSING SYSTEM AND ITS BEARING ON THE FILLER

Sterilization and cooking at temperatures higher than 212° F. can be carried on only at high pressures. For example, at 290° F. the pressure has to be maintained at not less than about 43 p.s.i.g., which corresponds to the vapor pressure of water at that temperature; otherwise the water content of the product will flash. Flashing cools the product, dropping it back to the temperature at which water vaporizes under the prevailing pressure. Flashing also tends to disintegrate the solid food particles; for example, if peas were being cooked under pressure at 290° F. and the pressure suddenly dropped, the peas would explode due to the sudden exit of steam from within the peas. Flashing also affects the flow of a continuous process by its effect upon the products in the process.

Therefore, in an aseptic canning process, it is very important to maintain back-pressure on the product stream. Ahead of the filler, the food is heated in a continuous stream to the sterilization temperature; then it is held at that temperature, while moving under pressure; next it is cooled to the desired filling temperature, while still moving and still under pressure, all this in order to maintain the back-pressure in the heating and holding portions of the system. It is therefore necessary to maintain the product under pressure until it is finally discharged from the filler. Accordingly, it is important that the filler operate at pressures not lower than this back-pressure and that the filler not cause this back-pressure to fluctuate any substantial amount. It is also important that the filler itself not be affected adversely by the pressure of the product stream and that the product not be affected adversely by the filler.

Fillers currently in use for aseptic canning of homogeneous liquids employ a metering pump just ahead of the filler in order to maintain this back pressure. However, when handling foods containing solid pieces, such as vegetable soup, such pumps give rise to three serious objections:

(1) The pump chops and disintegrates solid components and thus gives the finished product an unattractive mushed or mulligan-like appearance.

(2) Slippage of the liquid phase of the product under pressure through clearances in the pump results in straining out solid components in the pulsating or intermittent metering operation of the pump, with a consequent accumulation of the solid components in the line ahead of the pump. The solids thus accumulated in the line ahead of the pump are discharged with each cycle of the pump. If the liquid phase of the product is thin or of low viscosity, the slippage of the liquid through the pump will be so great that the speed of the pump will have to be greatly reduced in order to maintain the flow to the filler at a constant rate.

For example, in tests in which ⅜" cubes of carrots and potatoes were metered into a water solution containing no starch or other thickening agents and processed at 290° F. under a pressure of 60 p.s.i.g. at the rate of 5 gallons per minute, the speed of the back-pressure pump had to be reduced to less than one third of the speed corresponding to its actual volumetric capacity. In this test the solid components accumulated in the pipe and water-jacketed cooling tube ahead of the pump, while the water solution percolated or strained through the accumulated mass of cubed carrots and potatoes until the whole system (cooling tube, holding tube, float chamber and process chamber) became plugged with the solid material.

A subsequent test showed that with only water in the system under 60 p.s.i.g. pressure and with the back-pressure pump standing still and the drive motor turned off, the slippage of water through the pump was 6¼ gallons per minute. Obviously, it would be possible to reduce the pump's flow rate to 5 gallons of water per minute only by reducing the pressure in the system, with a corresponding reduction in temperature in the heating and heat-holding portions of the system.

(3) Metering pumps capable of handling liquid-solid mixtures without attrition of the solids can not be used in maintaining back-pressure in the system during presterilization of the equipment, because of the slippage through the pump. Even when the pump is standing still, slippage is such that steam pressure in the heating unit would have to be reduced below that necessary to maintain the temperature required to sterilize the system. Moreover, there would be flashing of the superheated water in the discharge side of the pump with a resulting reduction in temperature below that necessary for sterilization of parts of the pump and the system beyond the pump through the filler.

The filler of the present invention maintains the back-pressure in the product stream at all times in its operation, without causing fluctuation during any portion of the filling cycle and, moreover, the pressure level of the product stream does not adversely affect the filler or its operation. In contrast, none of the known fillers are capable of maintaining back pressure.

Hence, another object of the invention is to provide a filler for aseptic canning process that maintains back-pressure on the food being processed and is itself unaffected by this back-pressure. My invention accomplishes this object economically and in a simple manner, without introducing complexity and adding possible new causes of trouble.

A further object is to provide a filler that can readily be sterilized and can be maintained in a sterile condition during continuous operation at high can-filling speeds.

In addition to all these things, any filler must be capable of accuracy. Every canner has to give full weight and give it consistently, if he is to stay out of trouble with the Food and Drug Administration, but he also has to avoid giving too much if he is to endure competition. So another object of this invention is to provide consistent accuracy in a high-speed filling machine.

Further objects of the invention are to provide a filling machine of superior efficiency, simplicity of construction, and capable of high-speed operation; to provide a novel type of piston-and-cylinder filler with novel inlet and outlet valves; and to provide a novel type of cam operation of the inlet and outlet valves for the cylinder, together with a novel synchronization of the inlet and outlet valves with the piston, as well as novel means for adjusting the stroke of the piston to fill different sized containers with different amounts.

METERING AND BLANCHING OF SOLID PARTICLES

When aseptically canning a mixture comprising a liquid phase and a solid phase, special problems arise. One of these is the difficulty of maintaining a set proportion of liquids to solids all through the process. Obviously, no canning process can be satisfactory which results in filling some cans with more liquid and less solid than other cans. Usually there are several solid ingredients, as for example potatoes, peas, celery, carrots, and beef may all be added in chunks to the same soup. There is, then, also the problem of maintaining the correct relative proportions among these ingredients. To add all the solid ingredients to the liquid ingredients and then stir them by mechanical mixers is likely to result both in poor proportioning and in crushing, mangling or otherwise damaging some of the solid components.

Also, it is conventional to blanch solid ingredients before putting them into the liquid mix, and this has to be done in a way that will not result in either overcooking or underblanching.

The solution of these problems is among the objects of the present invention.

Other objects and advantages of the invention will appear from the following description of a preferred embodiment, and of some modifications.

BROAD CONSIDERATION OF THE PRESENT INVENTION

The present invention embodies a combination of sequential operations including (1) precooking or blanching each of the solid food constituents with both the temperature and time of treatment automatically controlled, (2) metering each of the precooked or blanched solid constitutents into the liquid phase of the product in the desired amounts and proportions, (3) mixing the solid and liquid components and feeding the mixture uniformly to a pumping stage, (4) pumping the mixture into and through a product heater, a temperature holding tube, and a cooling system, to a filler, while maintaining uniform distribution of the solid components in the mixture throughout these operations, (5) quickly beating the product mixture to temperatures in the range of 275–300° F. without local overheating or scorching of any parts of the product and without attrition or disintegration of the solid components, (6) conveying the heated product mixture through the holding tube, in which it is maintained at the elevated temperature for sufficient time to cause penetration of heat into and throughout the solid components, thereby effecting complete destruction of bacterial spores and other micro-organisms contained therein, (7) cooling the product mixture to approximately room temperature or to some other temperature below the flash point of the product at atmospheric pressure, and, (8) filling the cooled sterile product mixture in metered or measured amounts into presterilized containers while maintaining the product mixture under pressure in all parts of the system between the pump and the filler and while maintaining the filler in sterile condition at all times during operation.

In the drawings:

FIGS. 1A and 1B comprise a two-part isometric and partly diagrammatic view of an aseptic canning apparatus embodying the principles of the invention. Some parts are broken away and shown in section, to disclose other parts. FIG. 1A shows the metering and mixing apparatus and the product-sterilizing heater, while FIG. 1B shows the temperature-maintaining and cooling apparatus, the container sterilizer, the filler and the container-closing apparatus.

FIG. 3 is a further enlarged view in elevation and partly in section taken along the line 3—3 in FIG. 2.

FIG. 4 is a view in elevation and in section on the scale of FIG. 3 of a portion of the solids-metering and blanching apparatus of FIG. 2.

FIG. 5 is a still further enlarged fragmentary view in elevation and in section, taken along the line 5—5 in FIG. 2.

FIG. 6 is a fragmentary view in elevation and in section of an end portion of the feed screw used in the solids-metering and blanching apparatus.

FIG. 7 is a view in elevation and in section of a pump suitable for use in this invention.

FIG. 9 is a view in horizontal section, taken along the line 9—9 in FIG. 8.

FIG. 10 is an enlarged view in horizontal section taken along the line 10—10 in FIG. 8.

FIG. 11 is a view in elevation and in section of a portion of a modified form of antibridging device that may be used in the float chamber of FIG. 8 or in the mixing device of FIG. 2. FIG. 11 is on an enlarged scale with respect to FIG. 8.

FIG. 20 is an enlarged view in section taken along the line 20—20 in FIG. 19.

FIG. 21 is an enlarged vertical sectional view taken along the line 21—21 in FIG. 14.

GENERAL OUTLINE OF THE ASEPTIC CANNING SYSTEM OF THE INVENTION (FIGS. 1A AND 1B)

Figure 1B:
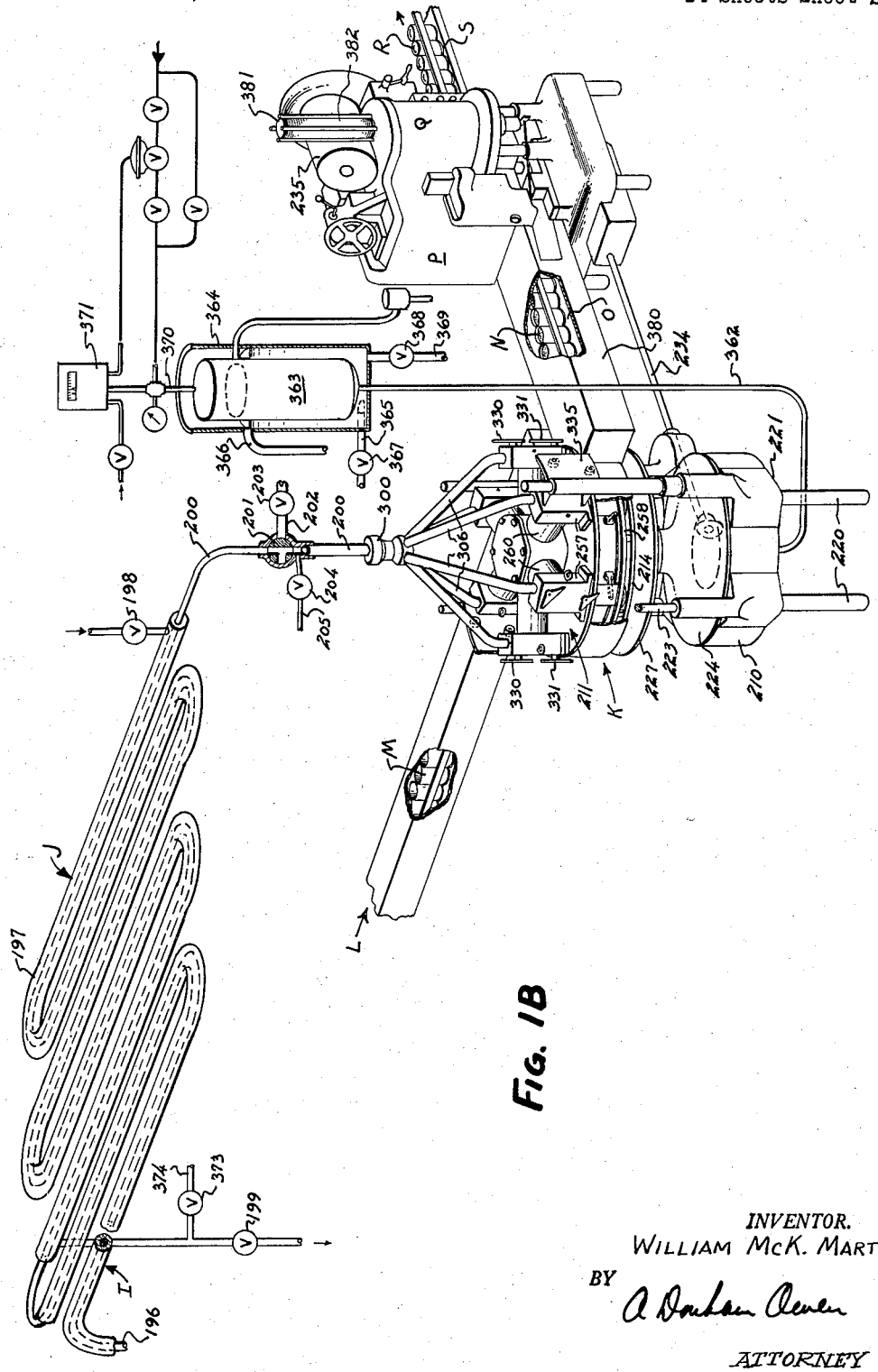

A liquid-supply unit A (FIG. 1A) feeds the liquid phase of a product to be canned to a liquid-metering unit B. Meanwhile, a solids supply, metering, and blanching unit C feeds various measured amounts of particulate or solid components into a mixing device D, where the solids are added to and mixed with the liquid. From there, the mixture is forced by a pump E through the remainder of the system, going first to a product-heating unit F and then into a flow-control device G. The flow-control device G regulates a variable speed motor H, which in turn controls the speed of the pump E and the metering rate of the solids-feeding unit C.

From the flow-control device G the hot mixture passes through a high-temperature-maintaining device I (FIG. 1B), where sterilization is completed, and then flows through a cooling means J. The cool sterilized product then flows to a filler K. A container sterilizer L supplies empty sterile containers M to the filler K, and filled containers N pass from the filler K through a sterile conveyer O to a closing machine P. A cover sterilizer Q supplies sterile covers to the closing machine P, which applies them to and seals them on the containers N. The sealed, filled containers R then leave the sterile closing machine P, and a conveyer S takes them outside the sterile atmosphere of the aseptic canner to non-sterile equipment such as the washer, labeler, case packer, and other equipment not directly concerned with the aseptic canning system.

THE LIQUID SUPPLY UNIT A (FIG. 1A)

The liquid supply unit A may comprise a steam-jacketed kettle 30 which contains a liquid food component 31. The steam-jacketed kettle 30 may preheat or even precook the liquid 31 to any desired temperature, usually below 212° F. For that matter, for some uses the liquid 31 may be at the ambient temperature in an unjacketed supply tank. An outlet 32 at the lower end of the kettle 30 may lead into a vertical pipe 33, for gravity supply is desirable in the steps preceding the pump E. However, a pump may be used here in connection with a recirculating bypass, if desired. The vertical pipe 33 preferably leads through a three-way valve 34 to a pipe 35. The three-way valve 34 is used during the presterilization of the aseptic canning system, at which time the valve 34 closes off the pipe 33 from the pipe 35 and connects the pipe 35 to a water pipe 36. The purpose and operation of this feature will be explained later. At any rate, the pipe 35 leads into the liquid metering unit B.

THE LIQUID-METERING UNIT B (FIG. 2)

The liquid-metering unit B includes a generally cylindrical housing 40 providing a float chamber 41 in which is mounted a float 42. The chamber 41 has a bottom inlet 43 connected to the pipe 35 and also has a radial outlet 44 part way up one side, lower than the desired level of the liquid 31 in the chamber 41. From the outlet 44 a generally horizontal conduit 45 leads into the mixing device D. The liquid 31 will, of course, have substantially the same level in both the chamber 41 and the mixing device D. The float chamber 41 is of sufficient capacity to give an even flow of liquid through it, resulting from the gravity head of the kettle 30 (or pump pressure, if a pump is used before the unit B), and for the same reason has an adequate clearance from the float 42. In a typical apparatus the chamber 41 may be 10" in diameter and the float 7" in diameter.

The float 42 is provided with a diametral tube 46 having an extension 47, which enables the float 42 to be slidably mounted on a rod 48. A thumb screw 49 makes it possible to fasten the float 42 at any desired height on the rod 48. The housing 40 has a cover 50 with an oversize, bossed axial opening 51, that serves as a guide for the rod 48 or extension 47. There is plenty of clearance between the tube extension 47 and the opening 51, to enable the escape of any entrained air, and air can also escape from the mixing device D, which is open to the air, for in neither is pressure allowed to build up.

The lower end of the rod 48 is pivotally attached to a linkage arm 52, which in turn is pivotally connected to a second arm 53. A thin, round butterfly valve 54 is mounted on the lower end of the arm 53 and both are pivotally attached to the housing 40 by a pair of pivot pins or bearings 55, which are axially in line with the rod 48 and the opening 51. The inlet 43 is provided with a valve opening 56 in which the butterfly valve 54 moves to throttle the flow. The butterfly valve 54 is, in principle and construction, hydrostatically balanced. Hence it is easily actuated by the float 42 at all liquid levels in the kettle 30 and at all liquid pressures in the pipe 35.

Figure 2:
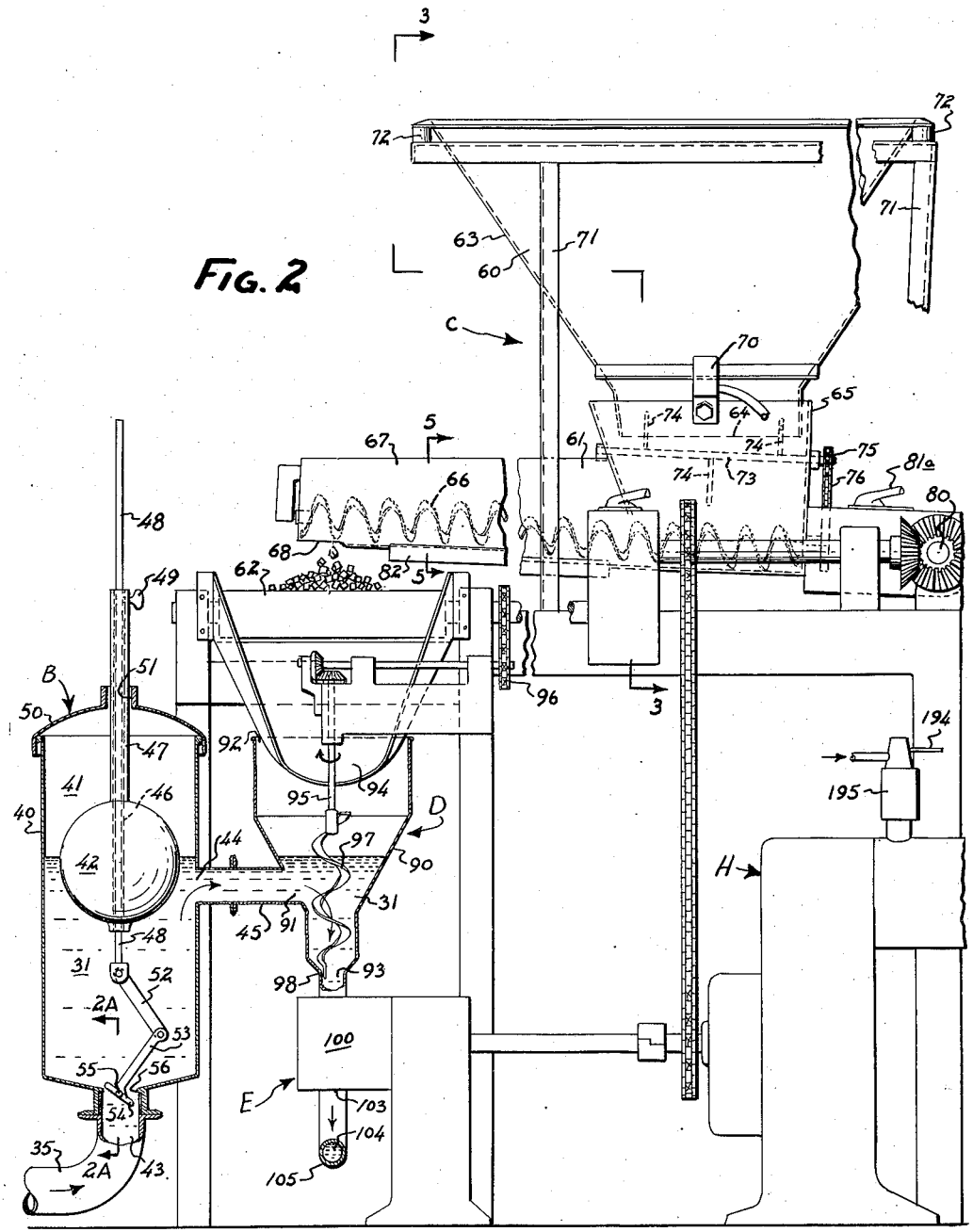
FIG. 2 is an enlarged view in elevation and partly in section of the apparatus for metering the liquid component of the food to be canned, for metering and blanching the solid components, for mixing them together and pumping them through the remainder of the system. Some parts are broken off or broken apart to conserve space.
Figure 2A:
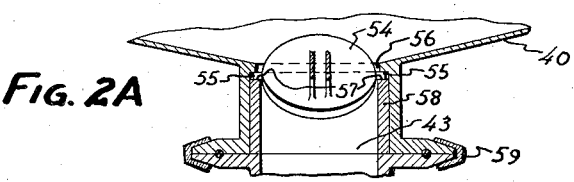
FIG. 2A is a fragmentary enlarged view in elevation and in section of the butterfly valve, taken along the line 2A—2A in FIG. 2.

To facilitate easy and thorough cleaning, the butterfly valve 54 is preferably made in the sanitary design illustrated in FIG. 2A. The valve 54, a thin metal disc, is mounted between the two bearings 55, which are exactly 180° apart. The bearings 55 are held in position in rounded notches 57 in a sleeve 58. The valve 54 can be readily removed, after removal of the cover 50 and float 42, by releasing a clamp 59 and sliding the sleeve 58 out from the housing 40, along with the rod 47 and the linkages 52 and 53.

As the float 42 rises, it moves the levers 52 and 53 to close the butterfly valve 54 and thereby to reduce the flow of liquid 31 past the opening 56. When the float 42 reaches a certain height, the butterfly valve 54 will close the opening 56, and the supply of liquid 31 will be practically cut off. When the liquid level drops, the float 42 opens the valve 54. The float valve 42 thus meters the flow of the liquid 31 from the kettle 30 to the mixing device D and the pump E; it prevents the mixing device D from either overflowing or running empty and assures a level that enables good mixing of the liquid with the solids coming from the unit C.

SOLIDS SUPPLY, METERING AND BLANCHING UNIT C (FIGS. 1A AND 2-6)

As shown in the drawings, the metering and blanching unit C for solids includes a series of hoppers 60, one for each solid ingredient, a metering device 61 at the lower end of each hopper 60, and a single conveyer belt 62 on which all the metering devices 61 mete out their ingredients and which carries them to and dumps them into the mixing device D.

The solid constituents to be measured out may be such things as cubed or sliced vegetables (e.g., potatoes, celery, carrots, onions), whole small vegetables (e.g., beans, peas, and small onions), and meat (e.g., cubed beef or slices of ham); the cubes may be about ⅜" or ½" on a side, or whatever size one wishes them, the cutting being done in any desired manner. If desired, any of these ingredients may be precooked or sauteed. Once prepared, the solid constituents are placed into their respective hoppers 60.

Each hopper 60 is substantially identical in design and operation but there may be such variations as are desirable to accommodate different products. As shown, each hopper 60 has a sloping wall 63 and an open lower end 64 which opens into a hopper-like housing portion 65 of the metering device 60. At the bottom of each metering device 60 is a preferably hollow screw 66 which is rotated so as to move the material out of the housing portion 65 and through and along a trough 67. The trough 67 is preferably semicircular in cross-section with its sides extending in substantial distance above the screw 66 and both its sides and bottom spaced from the screw 66 enough to protect the solid components from damage. The speed of the screw 66 determines the rate at which the food particles are dispensed onto the belt 62 through an opening 68 in the outer end of the trough 67. To enable blanching, as will be explained soon, the trough 67 is preferably tilted so that the screw 66 has to carry the material upwardly out of the housing 65. Each hollow screw 66 has a stub shaft 69 at its outer end, supported in suitable bearings. (See FIG. 6.)

The hopper 60 is preferably equipped with a vibrator 70 of any suitable type; e.g., it may be mechanical, electrical, or pneumatic. The vibrator 70 prevents the solid constituents from sticking to the sloping walls 63 of the hopper 60. It may be aided in its function by having the hopper 60 rest on a frame 71 through flexible or rubber supports 72, and by its having its lower end 64 free to move.

Mounted immediately above the screw 66 in the housing 65 is a shaft 73 on which are mounted a series of curved rods 74. The ends of the rods or fingers 74 preferably extend as close as possible to the housing and hopper walls, while still clearing them. On a one-foot shaft 73, three or four rods 74 spaced apart and set at different rotative positions on the shaft 73 are sufficient, and too many are undesirable, acting like a paddle. When the shaft 73 is rotated, the rods 74 revolve and prevent the product from caking or lodging and from bridging over the lower end 64 of the hopper 60. Preferably, the shaft 73 is rotated slightly slower, and at least no faster, than the screw 66. This may be done by driving it through a reduction gear 75 and chain 76 from a drive shaft 77 that drives the screw 66. Although the vibration of the sloping hoppers 60 is sufficient to cause most materials to flow freely into the metering device 61, some foods such as lasagne tend to stick together if compressed; without the revolving rods 74, the hollow rotating screw 66 would tend to extrude lasagne in worm-like chunks rather than in individual pieces.

It will be apparent from the foregoing description and from the drawings that the metering screw 66 actually measures the material and that the speed at which the screw 66 turns determines the rate at which the material is fed to the belt 62. All the screws 66 are preferably driven by the same variable-speed motor H which drives the input pump E, all the screws 66 preferably being driven from the same main drive shaft 80. In addition, each screw 66 has a separate variable transmission unit 81, with a calibrated control knob 81a for varying its individual speed. This makes it possible to adjust the metering rates of the various screws 66 relative to each other individually while at the same time driving all of them from the same motor H, whose speed is itself regulated in a manner to be explained later.

The conveyer belt 62 is preferably driven at a fairly high speed, so that the solid food components from the various metering units 61 are discharged in a continuous stream into the mixing device D. If the belt 62 moved too slowly, the solid components would build up and be discharged unevenly into the device D. Hence, the belt 62 moves faster than the material can be piled up on it; how much faster is not critical.

As stated earlier, the food solids are blanched or preheated as they move through the metering unit 61. For this purpose, the trough 67 in which the screw 66 moves is tilted upwardly toward its outlet 68. The amount of tilt may be adjusted by supporting the trough 67 in suitable bearings 78 on the shaft 80 and by providing an adjusting screw 79 between the trough 67 and the frame. If adjustment is not desired, a permanent tilt can be provided. Saturated steam or hot water or hot solutions of suitable composition may be used to provide the blanching heat. For this purpose, steam may be supplied to a tube 82 secured to the bottom of the trough 67, and pass into the trough 67 through openings 83. As the steam condenses in the unit 61, a hot water bath 84 may be provided, or, for a steam blanch, all the water may be drained out as it condenses through a bottom outlet 85. If desired, hot water or blanch solution may be directly added from a pipe 86 through nozzles 87 (FIG. 4), and when water or solution is used a higher outlet 88 carries off the excess above a predetermined level, a valve 89 then closing the bottom outlet 85. The blanching time used depends upon the temperature of the blanching agent, the length of the trough 67 and the speed of the screw 66. Since the temperature is never higher than 212° F., blanching time is usually not too critical, unless it lasts so long that it overcooks the food.

THE MIXING DEVICE D (FIGS. 1A AND 2)

The mixing device D comprises a funnel or housing 90 having a side inlet 91 connected to the conduit 45, an open upper end 92, and a bottom outlet 93, which preferably is also the inlet to the input pump E. Solid material falls from the belt 62 directly or down a chute 94 which ends below the open top 92 of the funnel 90, and liquid passes through the conduit 45 into the inlet 91. The liquid flow rate and its level are determined by the float 42, while the solid components falling from the belt 62 are metered by the unit C.

The device D not only performs the function of mixing the solid components with the liquid 31 as the liquid flows continuously into the input pump E, but performs the very much more important function of preventing the solid components from accumulating and bridging over the funnel outlet and pump inlet 93. Actually, the mechanical operation of mixing the solid components with the liquid is simple compared with the anti-bridging function of this apparatus.

An axial vertical shaft 95 is provided together with driving means 96, which may be, as shown, connected to the motor H, to rotate it at about 40–60 r.p.m. Too fast a speed tends to disintegrate the solids while too slow a speed provides neither adequate mixing nor adequate disbridging. On the shaft 95 is mounted a preferably hollow screw 97 having a descending helical thread terminating in a vertically downwardly extending, radially offset tip 98. This vertically depending tip 98 is an important element of the invention, for without it solid constituents such as cubed potatoes, carrots, beef, and the like soon bridge over the small outlet 93, which is also the pump inlet, and build up a pad or mat of solid constituents. The liquid would be sucked or drawn through the solids, and there would be no distribution of the solids. The solids would continue to build up until they overflowed the funnel 90.

The offset tip 98 of the hollow screw 97 revolves in a circle around and close to the inside wall of the inlet 93 to the pump E. The tip 98 is slender and tapered so as to leave as much free space as possible for the converging flow of solids and liquid into the pump E. The circular movement of the tip 98 around and close to the inside wall of the inlet 93 effectively dislodges the solid components which tend to bridge and close the inlet 93. If the tip 98 lay along the axis of the screw 97 and were concentric with the pump inlet 93, it would not dislodge bridged solid components; in fact, it would actually aggravate this problem, because it would leave an annular opening with the tip as an obstruction in the center instead of a free round opening. The tip 98 need not necessarily extend inside the opening 93, except for mechanical guidance. It must, however, be positioned sufficiently close to the inlet rim of the opening 93 to dislodge any bridged solid components. For practical mechanical reasons, the tip 98 preferably extends about ¼" inside the inlet 93.

Although circular motion of the tip 98 is preferable, oscillatory motion in a plane or arc has been used quite successfully. In fact, an oscillating or rapidly swinging ⅛" diameter stainless steel rod 99 (see FIG. 11) with a tip 98 has been used to prevent bridging of solids at the pump inlet 93.

Referring to FIG. 2, it will be seen that the open screw 97 is of steep pitch and of such dimensions that there is ample space for free flow of solids and liquid irrespective of the movement of the screw 97. This construction is used in order not to compress or compact the solid components. The hollow screw 97 provides a larger opening, more free space, for the free flow or movement of the mixture and damages the solids less than would a solid screw. The open screw 97 thus functions more as a revolving spiral stirrer than as an actual conveyor screw. A spiral rod with tapered tip may be used, if desired, in place of the screw 97, though the flattened screw is more effective in stirring and mixing the solid components into the liquid and tends to urge or gently impel the mixture downward into the pump without damaging the solid components. Thus, the open screw 97 gently stirs the mixture while at the same time impelling it downward into the inlet 93 of the pump E, where its slender tapered tip 98 moves in a circle and prevents bridging of solid components, as already explained.

The liquid level in the mixing funnel 90 is maintained only high enough to facilitate effective mixing of the solids with the liquid. If the level is too high above the inlet 91, the larger volume of liquid will not be as effectively stirred by the revolving screw 97. The solid components would not, in this case, be as evenly mixed with the liquid flowing through the bottom part of the mixing funnel 90. If, on the other hand, the level of liquid in the mixing funnel 90 were maintained at too low a level, there would be danger of air being drawn into the pump E along with the product mixture. The proper level has been found to be slightly above the inlet 91.

THE INPUT PUMP E (FIGS. 1A, 2, AND 7)

The input pump E is a suitable type of positive-displacement pump driven by a variable-speed motor H. It should be capable of pumping liquid products at pressures up to about 80 to 100 pounds per square inch and capable of operation without chopping or mechanically disintegrating the relatively soft food solids. It is a valveless pump, for valves tend to crush, cut, or chop the product. One such pump is shown in FIG. 7. It has a housing 100, a pair of twin-lobed impellers 101 and 102 and an outlet 103. Single lobe impellers are also satisfactory. Such pumps are made by Waukesha Foundry Company and by Creamery Package Company. Alternatively, a Robbins and Myers Moyno pump may be used.

The pump E feeds the mixture 104 into the pipe 105 and on through the system to the point where the filler K dispenses the mixture 104 into the containers M. There are no valves or other obstructions between the pump E and the filler J, though there is the flow-control device G beyond the heater F.

THE PRODUCT STERILIZER-HEATER F (FIGS. 1A, 8, AND 9)

The heater F includes an insulated housing 110 having a cylindrical upper portion 111 with a closed upper end 112, a central cylindrical portion 113, and a conical funnel-like lower portion 114. The housing 110 may conveniently be made in two flanged pieces held together by eye bolts 119 having a ring 119a fitting through the eyes to give even pressure. The lower portion 114 has an outlet tube 115 leading from near its lower end at one side thereof and also has a central axial bottom opening 116. The inlet pipe 105 leads into the opening 116. An inlet tube 117 has its lower end rotatably mounted in this bottom opening 116 with suitable sealing means 118 to prevent leakage of the liquid at that point.

A motor 120 is provided to rotate the inlet tube 117 at a desired speed, preferably around 40 to 60 r.p.m. The inlet tube 117 has a portion 121 extending at an angle up into the housing 110, generally parallel to the conical wall 114. At its upper end, the tube 117 has an outlet spout 122 that always faces the adjacent central cylindrical housing wall 113, closely adjacent the upper end of the lower portion 114. The tube 117 and spout 122 act to pour the product gently down the sloping wall 114 and to distribute it around the housing 110 in a thin film. The slow speed of rotation of the spout 122 does not project the product by centrifugal force against the walls. The gently flowing product is heated by surface contact only with a swirling mass of superheated steam.

The housing upper portion 111 is provided with a pair of annular partitions 123 and 124. The lower partition 123 is preferably conical and extends inwardly and downwardly to an inner periphery 125. The upper partition 124 also slopes down and is approximately parallel to the lower partition but is provided with a depending cylindrical portion 126 spaced inwardly from the inner periphery 125 of the lower partition 123. The lower end of the depending cylindrical portion 126 is tapered outwardly and terminates in a generally radially outwardly extending flange 127. The periphery of the flange 127 is approximately in vertical alignment with and approximately at the same radius as the inner periphery 125 of the lower partition 123. Between the upper and lower partitions 123 and 124 the upper housing wall 111 is provided with an inlet opening 128 for super-heated steam. A cooling channel 129 is provided for circulating water to keep the adjacent housing wall cool so that spattered soup or other food product being heated will not be burned onto the housing surface. Additional channels like the channel 129 may be provided wherever desired, especially where the housing is shaped differently than the housing 110. For example, there may be one around the wall 113.

Thus the housing 110 is divided by the partitions 123 and 124 into three main chambers, an upper chamber 130, an intermediate chamber 131 where the steam is introduced, and a lower chamber 132 into which the food product 104 is introduced by the revolving spout 122. From the spout 122 the product 104 flows gently onto the vertical wall 113 and down the sloping wall 114, the rotation of the inlet tube 117 serving to spread the product 104 out into a film-like mass 133. The slope of the wall 114 depends upon the viscosity of the material 104 and upon the contact time desired to heat it. For more heating contact, the slope should, of course, be less, and for less viscous material the slope should also be less. A slope of about 45° is satisfactory for many soups, but different slopes may be used, depending on the desired operating conditions including the size of the device as well as the type of product.

The upper end wall 12 of the housing supports a drive shaft 134, which extends down along the axis of the housing and at its lower end supports a fan 135. The drive shaft 134 projects out of the housing 110 and is provided with suitable driving means, such as a high-speed motor 136 acting through a belt 137 and a sheave 138 on the shaft 134. A suitable thrust bearing 139 is provided to support the shaft 134, and preferably the shaft 134 is protected and sealed by a housing 140, which encloses a cooling tube for water and a lubricating system for the shaft 134.

The fan 135 is a compound structure rotating with the drive shaft 134. It includes a hub 140a from which extend a plurality of inner blades 141 which are tilted so that, when they rotate, they move steam from below them to above them. At the outer periphery of the inner blades 141 is a cylindrical shell 142 which, of course, also rotates with the shaft 134. The upper end of the shell 142 fits fairly closely within the cylindrical depending portion 126 of the upper partition 124, with a suitable working clearance. A series of radially outwardly extending rods 143 is supported by the hub 140a and supports a circular rim 144. This rim 144 extends vertically to a level up just below the lower partition 123 and just radially beyond the outer periphery of the flange 127. The upper part of the rim 144 is cut and bent to provide a series of impeller blades 145.

Thus it will be seen that the intermediate chamber 131 serves as a steam entrance and distributing chamber with the steam coming in through the inlet 128 and going out along the lower edge 125. The impeller blades 145 rotating at high speed (e.g., at about 1800 r.p.m. in a housing 110 about 3' in diameter) pull the steam out from the chamber 131 and impel it in a whirling motion inside the lower chamber 132 and out toward the walls 113 and 114 down which the food product 104 is flowing gently. To prevent the impeller blades 145 from driving some of the steam back up into the chamber 131 and causing counter currents, a series of stationary vertical baffles 146 is provided, tilted in the opposite direction to which the blades 145 are tilted.

The hot steam (e.g., at 800–1200° F.) whirled out by the blades 145 (see FIG. 9) comes against the descending food product 104 that is flowing gently down the walls 113 and 114 of the lower housing, this gentle flow constantly exposing new surfaces of the product 104. The whirling steam does not enter the food product but does heat its surface. Then the cooled steam (e.g., at 350–400° F.) is sucked up by the fan's inner blades 141 and pulled through the interior of the cylindrical partition portion 126 into the upper chamber 130.

The whirling blades 145 provide for very efficient heat transfer by the high-velocity flow of the superheated steam and also throw back into the film 133 any droplets or particles of the food product, to prevent them from splashing against any metal surfaces where they might be charred. In this invention the mixture 104 touches only walls that are cooler than the mixture, i.e., the walls are insulated from the steam by the mixture itself.

A tube 147 leads from the chamber 132 to the control device G for maintaining pressure equalization, as will be explained later.

The upper chamber 130 is provided with a suitable steam exhaust outlet 148 from which a duct 149 conducts most of the steam to a gas-fired superheater 150 (FIG. 1A) for recirculation. The superheater 150 is provided with a gas burner 151 and heat-exchanger tubes 152. A conduit 153 leads from an outlet manifold 154 of the superheater 150 to the inlet 128 of the product heater F. The return steam enters the tubes 152 from an inlet manifold 155. A steam bleed or discharge orifice 156 provides for the discharge of a constant small amount of steam in order to remove air or other undesirable gases from the system, while a steam inlet 157 admits a controlled amount of make-up steam.

Thus, superheater steam is continuously recirculated through the product heater F from the gas-fired superheater 150 by the fan blades 145 and 141. The superheated steam from the superheater 150 is impelled tangentially into the chamber 132 by the revolving impeller blades 145. The superheated steam thus whirled circularly in the chamber 132 sweeps the surface of the product mixture flowing gently down the walls 113 and 114 and quickly heats the continuously flowing product to the desired process temperature. After sweeping the surface of the product and imparting part of its heat to the product, the steam is recirculated by the fan blades 141 through the chamber 130 and the duct 149 to the manifold 155, and thence again through the superheater 150. The steam thus reheated is returned through the duct 153 to the annular chamber 131 from which it is again impelled tangentially into the product heating chamber 132.

REMARKS ON THE OPERATION OF THE PRODUCT HEATER F

A very important feature of the product heater F is that the product is heated solely by superheated steam at an interface between the steam and the food product 104. Both the product and the steam are moving, but the steam is not injected into the product. There is no mixture of the steam with the product. The contact is solely with the surface of the product, and that fact distinguishes it from the prior-art attempts to use steam heating, for in them the material was always heated at least partly by mixture.

The superheated steam impinging upon the gently flowing liquid product strikes the product with sufficient force to cause an interchange between the portion of the product that is on the surface and the underlying product, so that most or all portions of the liquid are presented to and contacted by the steam for uniform heat transfer throughout the entire liquid mass, all without intermixture of steam and product and without violent agitation of the product. Also, since the liquid is in a relatively thin layer, and since the steam is impelled generally uniformly in the chamber, a large liquid-gas interface is presented for optimum heat exchange.

Note that the heat is applied to the flowing liquid product directly from the superheated steam through a liquid-gas interface, without employing a solid heat-exchange surface. There is no burn-on, for that can result only when a static portion of a liquid product is overheated at a solid heat-exchange surface and adheres to it. In the heat exchanger of the present invention, the product itself insulates the walls 113 and 114 of the annular chamber 132 so that they cannot be raised to a sufficient temperature to cause burn-on or congealing of solids on the underlying metal surface. Only at the upper edges of the liquid does steam reach a metal wall 158 contacting the liquid, and here the cooling channel 129 prevents overheating of the metal wall.

The amount of heat imparted to the steam from the heating unit 150 may be made sufficient to heat the liquid entirely by convection rather than by any latent heat of condensation, at least when considering the net effect. For although some of the superheated steam will condense in the cooler portions of the liquid, an equivalent amount of steam is vaporized from the liquid.

My method of heat transfer may be better understood by first considering for a moment what would happen if the liquid were heated by saturated steam at 212° F. Although there still would be no mixture of the steam with the liquid in my process, some of the steam would condense and become part of the liquid, increasing its total volume and diluting it. All the heat transferred by such condensation would be due to the latent heat of condensation. Now, when the steam is heated to any point above 212° F., some of the heat transfer is due to the specific heat content of the steam being imparted to the liquid, the remainder of the heat transfer still being by condensation.

By making the steam hot enough and circulating it sufficiently rapidly, all the sensible heat will be transferred by convection, i.e., the transfer of heat will be by moving masses as distinguished from the transfer of heat through stationary masses, which is termed conduction. In the prior art, heat was usually transferred through the metal walls of a heat exchanger by conduction, whereas in the present invention heat is transferred by the physical movement of steam masses against liquid masses. This use of convection also distinguishes the present process from processes in which steam is mixed with the liquid and condensed into the liquid to transfer heat by the latent heat of condensation. In this invention, heat transfer can be entirely by latent heat of condensation or entirely by convection, depending on the amount of heat imparted to the steam in the superheater 150, on the volume and velocity of the superheated steam impinged onto the surface of the liquid product 104, and on the rate of flow of the liquid product.

If the heat imparted to the steam is increased beyond the equilibrium point, the amount of steam vaporized from the liquid will exceed that condensed in the liquid. If condensation is desired, this state will prevail. If equilibrium is desired, it is obtainable. At the equilibrium point the amount of heat imparted to the steam will be just sufficient to keep condensation and vaporization in balance. Operation is usually done with the steam at about 900° to 1200° F. when it leaves the superheater 150. Usually the blower fan 135 is kept at a steady rate of about 1750 to 1800 r.p.m. or even 3600 r.p.m., but it can be speeded up to increase the rate of heat transfer by convection or slowed down to give the opposite result.

The reason for whirling the superheated steam in the product heating chamber 132 is three-fold: (1) to prevent intermixing of the steam and the product, and thus to maintain the steam and the product as two distinct and separate phases in the heating operation, (2) to prevent the product from spattering onto the hot metal surfaces of the heating chamber 132, on which a spattered product would char and then fall into the product being processed and degrade it, and (3) to prevent entrainment of droplets or particles of the food product in the steam recirculated through the superheater 150.

The prevention of intermixture has been discussed. As to spattering, even the smallest microscopic droplets of product must be prevented from coming into contact with the hot metal surfaces. The whirling superheated steam picks up any droplets of product that even momentarily leave the surface and throws them back into the gently flowing product stream by centrifugal force.

Of equal importance is the prevention of entrainment of minute droplets or particles of product in the departing steam, where it would burn in the gas-fired superheater and impart a bad taste and smell to the product when the steam is recirculated. For that reason the return flow of steam from the chamber 132 to the gas-fired superheater 150 is from the center of the chamber 132, which is in effect the vortex of the whirling mass of steam. It follows that any microscopic particles of product will be separated from the whirling mass of steam by centrifugal force and not accompany the steam up from the vortex.

The results of extensive tests involving the continuous processing of pea slurry for 8-hour periods with the superheated steam maintained at a temperature in the range of 800–1000° F., showed no burn-on—not even a trace—on the fan surfaces, on the walls of the housing 110, on the ducts 148 and 153, or in the superheater tubes 152.

Another very important feature of the present invention is the means of avoiding burn-on and accumulation of incrusted charred product at the boundary of the liquid product and the hot metal surfaces 158. Since the product and the steam are maintained as separate and distinct phases, there is necessarily a boundary at which the product meets the hot bare metal surface 158. The surface 158, being bathed with steam, tends to attain approximately the temperature of the steam, whereas the metal surfaces 113 and 114 beneath the product will be at a temperature lower than that of the product 104. The product striking the boundary therefore tends to burn onto the hot metal surface and rapidly accumulate in the form of an incrusted mass which will be charred by hot steam.

The centrifugal effect of the superheated steam keeps the boundary of the product on the surface 158 close to the vertical wall 113. To prevent burn-on, incrustation and charring of the product on the metal surface 158 a stream of cooling water is circulated through the small annular cooling channel 129. The cooling channel 129 serves as a barrier to the conductance of heat from the superheated steam through the metal 158 to the boundary. By dissipating heat from this narrow margin of metal between the boundary of the product and the superheated steam, burn-on and incrustation of the product is entirely prevented. The cooled margin of the metal surface 159 will be wet with steam condensate at all times, and in consequence the troublesome boundary meets a wet surface instead of a hot dry metal surface.

The "cool barrier" can be provided by other structural designs than the channel 129. For example, a large cooling ring may be provided in the same location as the channel 129, through which the product is pumped before entering the distributor tube 117. The product is thus used as the coolant, the cooling channel serving the two-fold purpose of preheating the product and cooling the metal surface at the boundary between the product and the superheated steam.

The distributor tube 117 rotates at a relatively slow speed, preferably about 60 r.p.m. For a normal-diameter (e.g., two to four feet) housing 110, it should not revolve faster than about 80 r.p.m. because higher speeds of rotation have been found to damage and disintegrate tender frangible solid components in the product. Neither should speeds slower than about 30 r.p.m. be used, for to do so would result in discontinuous flow of product down the walls 113 and 114 of the chamber 132. That is, slow revolution of the distributor spout 122 would cause the product 104 to flow down the metal surfaces 113 and 114 in waves between which the surfaces 113 and 114 would drain substantially dry, and consequently the metal surfaces would be heated by direct contact of the superheated steam between cycles of the product distributor. The product distributor 122 should revolve at sufficient speed to keep the metal surfaces 113 and 114 wetted and covered with sufficient product 104 to prevent the underlying metal from being heated directly by the steam. In this way, the metal surfaces 113 and 114 are always kept at a lower temperature than the product 104 flowing in contact with them, and there is no burn-on or congealing of the product on the metal surfaces.

That the metal surfaces 113 and 114 are always at a lower temperature than that of the product 104 flowing over them has been demonstrated by actual tests in which three thermocouples were silver-soldered to the outside surface of the housing walls: one at the mid-point on the vertical wall 113, one at the mid-point of the sloping wall 114, and one at the bottom of the sloping wall 114 near the outlet 115. With the product distributor 122 revolving at 77 r.p.m., in a chamber 130 fourteen inches in maximum diameter, a split-pea slurry at a temperature of 186–192° F. was flowed continuously through the distributor spout 122 at a rate of 5 gallons per minute. With the superheated steam in the chamber 132 at 620° F. under a pressure of 62–79 p.s.i.g., the temperature of the metal surfaces beneath the flowing slurry, as recorded by the thermocouples, was 210–218° F. for the mid-point of the metal surface 113, 267–270° F. for the mid-point of the metal surface 114, and 284–290° F. for the metal surface at the bottom of the chamber. The slurry itself attained a final temperature in the range of 290°–294° F. at the outlet 115.

TEMPERATURE AND PRESSURE REGULATION OF THE HEATER F (FIGS. 1A AND 8)

The quantity of heat imparted to the steam as it flows through the superheater 150 may be controlled by the temperature of the heated product, as by a temperature sensing element 160 located between the control device G and the temperature-maintaining device 1. The temperature sensed by the element 160 is preferably transmitted to a recording temperature controller 161 of any suitable type.

The controller 161 may control the volume of gas-air mixture flowing to the gas burner 151 by means of a compressed air signal. Compressed air, with its pressure regulated to a constant value by a regulator valve 162, is supplied to the controller 161, and there its pressure is varied in accordance with the temperature sensed by the sensing element 160. The air then passes by a tube 163 to the diaphragm chamber 164 of a diaphragm-actuated butterfly valve 165. Air supplied under pressure, as by a blower (now shown), passes through the valve 165 into a mixing chamber 166, and its pressure acts on a second diaphragm-actuated valve 167 controlling the admission of fuel gas. The valve 167 assures that the quantity of gas admitted from a gas supply line 168 to the mixer 166 will always be in constant proportion to the quantity of air admitted to the mixer 166. A proportioning valve 169 is used to adjust this proportion.

The quantity of the gas-air mixture supplied to the burner 151 is thus controlled to give a constant temperature of the product at the sensing element 160.

Pressure may be controlled similarly. A pressure tube 170 may transmit the pressure inside the chamber 132 to an indicating pressure controller 171. Air under constant pressure determined by a regulator valve 172 enters the controller 171 where its pressure is varied in accordance with changes in the pressure in the tube 170. This signal air then passes through a tube 173 to the diaphragm chamber 174 of a diaphragm-actuated valve 175. The valve 175 admits pressure steam from a suitable source through a conduit 176 and the steam inlet 157 into the conduit 148 leading to the superheater inlet manifold 155.

As noted before, some steam (along with air, etc.) is constantly being bled from the system through the orifice 156; so the pressure in the chamber 132 will drop unless further steam is supplied through the inlet 157. The pressure controller 171 assures that the proper amount of steam will be added to maintain the pressure of exactly the right amount.

The amount of heat imparted to the product 104 flowing continuously through the heater F is determined by a combination of conditions, the most important of which are:

(1) The temperature of the superheated steam in contact with the surface of the product 104.

(2) The surface area of the product 104 in contact with the superheated steam.

(3) The rate of flow of the superheated steam whirled in contact with the surface of the product 104.

(4) The rate of flow of the product 104 through the product heater F.

(5) The depth of the film or layer 133 of the product 104 exposed to the superheated steam while flowing down the walls 113 and 114.

(6) The pressure of the superheated steam in the heater chamber 132.

In the operation of the heater F, unless the pressure of the superheated steam is equal to or in excess of the vapor pressure corresponding to the mean temperature of the product 104 as recorded by the temperature sensing element 160, the product will flash in the control device G and in parts of the temperature-maintaining device I situated above the control device G. The pressure in the heater F is therefore set and maintained by the pressure controller 171 at a predetermined value equal to or in excess of the vapor pressure of the product in the devices G and I.

For example, when the product is to be heated to a temperature of 290° F. as recorded by the sensing element 160 and automatically regulated at this temperature by the temperature controller 161, the pressure controller 171 is set to maintain a pressure of about 50 p.s.i.g. in the heater F and in the control device G. The vapor pressure of the product at a temperature of 290° F. is approximately 43 p.s.i.g. and about 7 p.s.i.g. excess pressure above that value has been found sufficient to prevent the product from flashing. A slight decrease in the temperature of the product 104 flowing past the temperature sensing element 160 causes an increase in heat at the gas burner 151 and a corresponding increase in the temperature of the superheated steam, which will thus bring the temperature of the product 104 up to the desired level.

As the pressure in the heating chamber 132 is decreased and approaches the vapor pressure of the product 104 at the process temperature, the amount of steam condensing in the product 104 decreases. If, for example, the temperature controller 161 is set to maintain the temperature of the product flowing past the sensing element 160 at 290° F. and if the pressure regulator 171 is set to maintain the pressure at 43 p.s.i.g., the air signal transmitted from the temperature controller 161 to the valve 165 will increase the air-gas supply to the burner 151 until the amount of steam condensing in the product 104 is exactly equal to the amount of steam vaporized from the product 104 and discharged continuously through the bleed orifice 156. At this equilibrium point the amount of steam admitted through the make-up steam inlet 157 by the pressure controller 171 will be exactly equal to the amount discharged through the bleed orifice 156.

If the pressure controller 171 should be set for a pressure below that corresponding to the vapor pressure of the product 104, the temperature of which is still maintained at 290° F., no steam would be admitted to the inlet 157 by the pressure controller 171, and the bleed of steam through the orifice 156 would reduce the pressure in the chamber 132, with a resultant flashing of the product 104. The flashing would cool the product; so the sensing element 160 would call for more heat from the superheater 150 until equilibrium is again reached. The temperature control system thus would automatically operate to supply not only the amount of heat required to heat the product 104 to the process temperature (e.g. 290° F.) but to supply also the amount of heat needed to vaporize from the product the amount of steam discharged through the bleed orifice 156. The product 104 would thus be condensed in this type of operation.

THE CONTROL DEVICE G (FIGS. 1A, 8, 10 AND 11)

From the heater F, the food flows through heat-insulated equipment until it reaches the cooling tubes J. The insulation 177 is not in all instances shown in the drawings, for the sake of simplicity. The conduit 115 leads from the heating chamber 132 to the control device G, which has a housing 180 providing a float chamber 181. Depending from the top of the float chamber 181 is a shaft 182, driven by a suitable motor such as the motor 120 and on it is slidably mounted a float 183. At the lower end of the shaft 182 is a hollow screw 184 like the screw 97 in the mixing device D in construction and operating in exactly the same manner and for the same purpose, that is, for assuring the transmission of the mixture of materials and with a tip 98 that prevents bridging of the outlet 185 and crushing, mangling, or injuring the solid particles.

The float 183 is mounted slidably on the shaft 182 but has no other relation to it except that the shaft 182 serves as a guide maintaining the float 183 in proper diametrical alignment. A lever 186 attached to the float 183 operates a needle valve plunger 187 through a link 188 and a crank 189.

The needle valve 187 serves to throttle a constant stream of air under pressure (e.g., 20 p.s.i.g.) from a pneumatic tube 190, and serves as a control for the variable-speed motor H which drives the pump E. As the liquid level in the float chamber 181 rises, a bleed passage 191 that leads to a bleed outlet 192 is opened wider, thereby reducing the pressure of the air in a chamber 193 ahead of the outlet 192. This reduction in pressure effects a reduction in pressure in a tube 194, which, in turn, lowers the pressure in a pneumatic amplifier 195 (see FIGS. 1A and 2), such as a Varitrol, which then acts to slow down the speed of the motor H for the pump E and the metering-blanching unit C. Then, the float 42 acts on the butterfly valve 54 to control the liquid level also, so that the liquid is also metered to give the correct proportion of liquid to solids. Thus the different parts of the system act on each other. In this connection, it should be pointed out, the cause of liquid rising in the chamber 181 and raising the float 183 is either that the pump E is feeding material too fast, or that the filler K is dispensing material slower than its normal constant rate. Normally, the level of the liquid in the float chamber 181 is constant.

A calibrated liquid level indicator 178 may also be operated by the float 183 and helps in setting the proper level in the chamber 181. The level of the liquid in the float chamber 181 should always be high enough to prevent escape of steam into the temperature-maintaining device I and cooling device J. It also should not be below the point where the tube 115 enters the chamber 181, so that steam from the chamber 132 cannot circulate through the chamber 181 and pressure-leveling tube 147, disrupting the steam circulation system and causing burn-on on and near the float 183. The level should not rise so high as to back heated product up into the housing 110.

The pressure-equalizing tube 147 maintains the pressure in the chamber 181 at the same level as in the chamber 132, so that the level of the float 183 is not affected by pressure differences. The tube 147 is not used to circulate steam; it merely equalizes pressure. The steam in the chamber 181 is saturated and at substantially the same temperature as the product 104 in the chamber 181. This arrangement has been found to be effective in keeping the product from burning onto the float 183 and the housing 180.

THE TEMPERATURE-MAINTAINING DEVICE I (FIG. 1B)

The fluid passes from the outlet 185 into the temperature-maintaining device I by which it is held at the desired temperature for a time sufficient to complete sterilization, which may be from a few seconds up to about a minute. The larger the solid particles, the longer the time necessary to assure complete penetration of the particles by the heat at the holding temperature. For liquids like homogeneous pea soup 8 to 10 seconds at 286° F. is sufficient. For vegetable soup containing ⅜" cubed vegetables, a holding time of 38 seconds at 290° F. has been found sufficient for complete sterilization.

The device I may comprise an insulated tube 196 of diameter great enough to prevent damage to solid pieces in the moving product 104 and long enough to give the desired holding time while the product is continuously moved through the tube 196 by the pressure imparted in the heating chamber 132 at a velocity sufficient to maintain the proportions of the mixture without damage to the solid particles. Here, sterilization is finished.

THE COOLING DEVICE J

Next, the liquid passes into the cooling tube J, which is provided with a water jacket 197 having an inlet valve 198 and an outlet valve 199 which enable the cooling tube to be drained during initial sterilization. From there the mixture passes through a pipe 200 to the filler K. Just before the liquid reaches the filler K, there is a valve 201 to which is attached a drain conduit 202 with a back-pressure valve 203. Just beyond the valve 201 is a second valve 204 which may be used to admit steam from a conduit 205 during the presterilizing of the system.

CONTAINER STERILIZATION (FIG. 1B)

In the meantime, containers M have been sterilized by a suitable sterilizer L, such as is well known in the art. The containers M are then ready to be fed into the filler K through a sterile passageway 206 by a star wheel 207.

BRIEF GENERAL DESCRIPTION OF THE FILLER K (FIGS. 1B AND 14–16)

Figure 15:
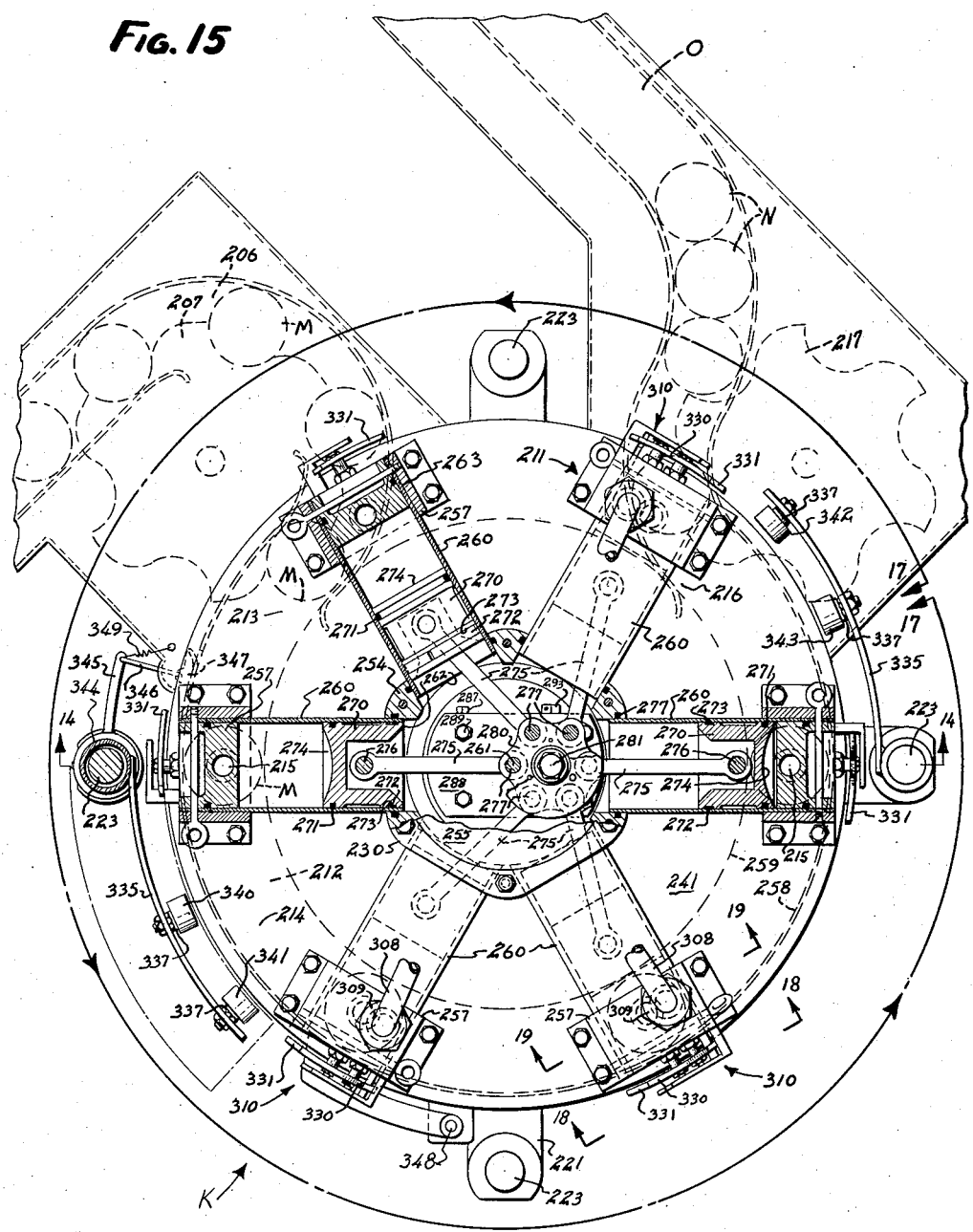
FIG. 15 is a top plan view of the device of FIG. 14, partly broken away and shown in section omitting some parts that would tend to obscure the view.

In general the filler K shown in the drawings comprises a stationary main frame 210 and a rotating assembly 211 supported by the frame 210 and cooperating therewith to define a chamber 212 inside which sterile conditions are maintained, as by introducing a steady stream of steam from the container sterilizer L and the passage 206. Presterilized empty cans M or other suitable containers enter from the container sterilizer L via the enclosed sterile passage 206 and the star wheel 207. The star wheel 207 introduces each empty can M into the chamber 212 through an inlet opening 213, and the can M is carried around a stationary track 214 (supported by the frame 210) while at all times being kept in alignment with a dispensing outlet 215 (FIG. 15). The can M travels approximately 270° along the track 214 and is then taken out as a filled can N at an outlet 216 by a star wheel 217 (or by fingers of a feed chain) and sent by the conveyor O to the closing machine P, both of which are also maintained in a sterile atmosphere.

THE FILLER FRAME 210 (FIG. 14 MAINLY)

The stationary frame 210 may include suitable standards 220 to hold the filler K above the floor level. The standards 220 support a base 221, which supports the remainder of the frame 210, including a central vertical stationary pipe 222 and a series of upright rods 223 spaced around the periphery of the filler K. The base 221 also supports an annular gear housing member 224 with an upwardly extending bearing boss 225. Secured rigidly to the exterior of the boss 225 is a spider 226 that supports an annular rim 227 with a cam track 228, discussed later. The rim 227 also supports the can track 214 on a series of standards 29.

Figure 14:
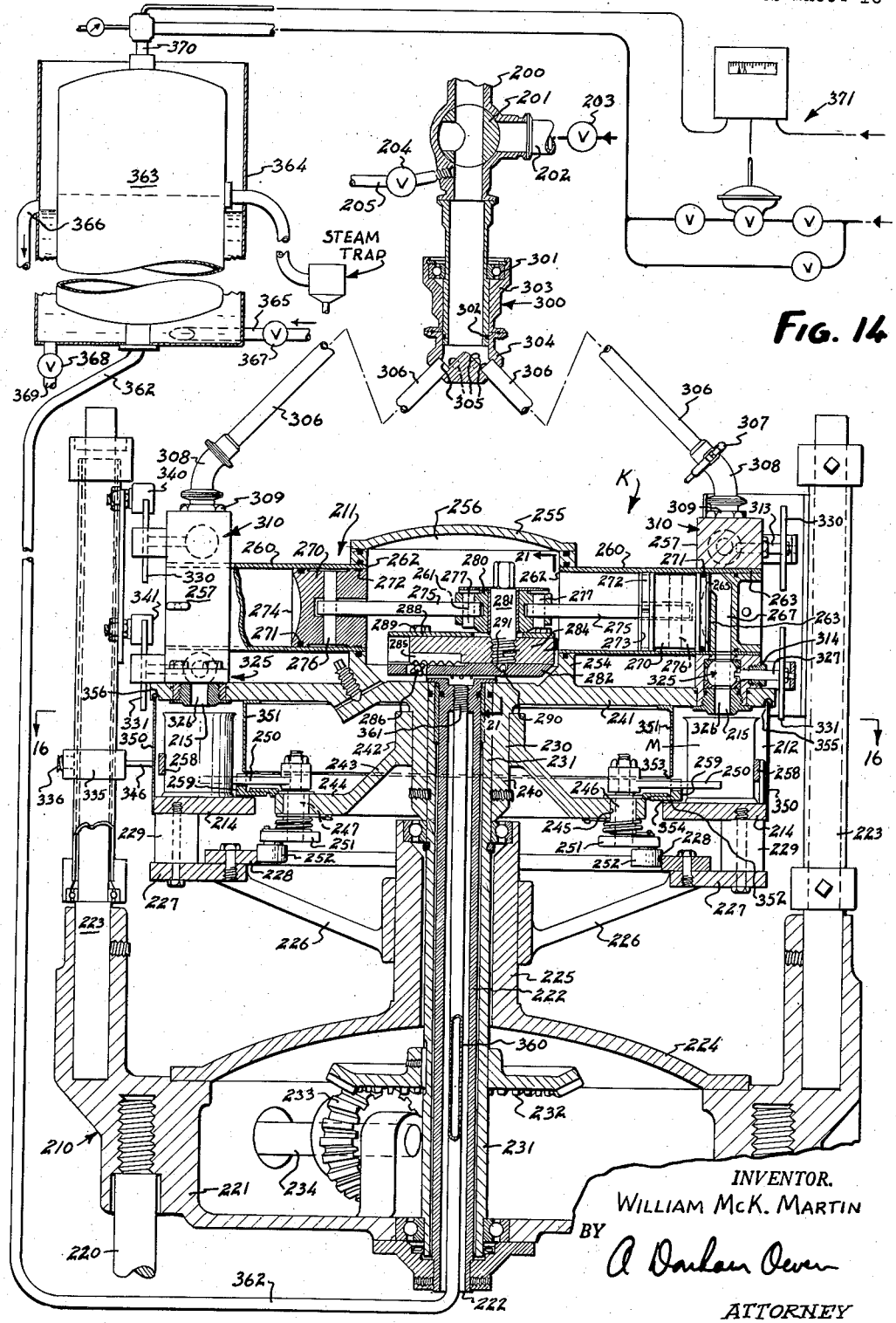
FIG. 14 is a view in elevation of a filler embodying the principles of the invention. Some parts have been omitted, some parts have been broken off, and some parts have been broken away and shown in section along the line 14—14 in FIG. 15 to reveal parts behind them more clearly.
Figure 16:
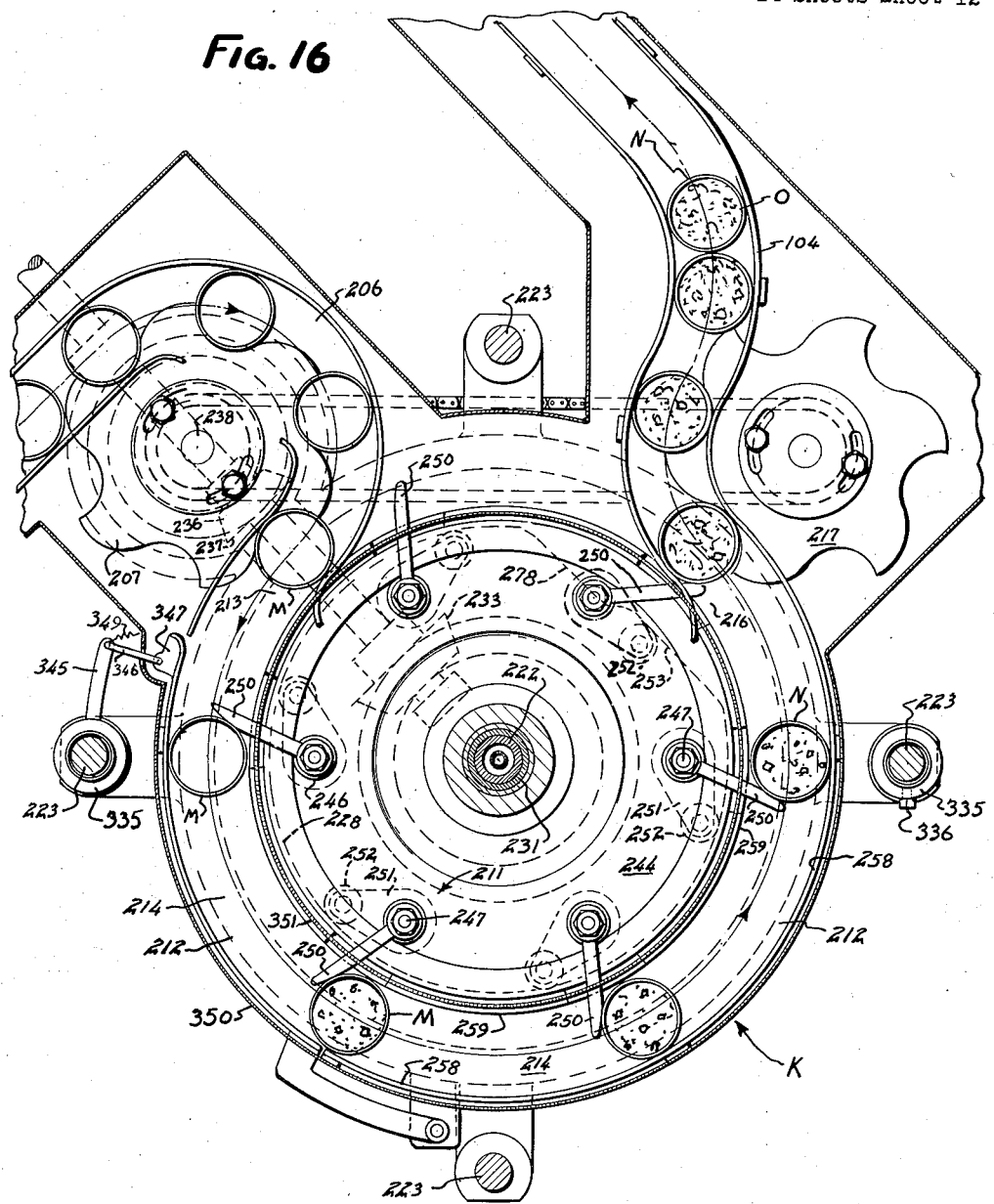
FIG. 16 is a view in horizontal section taken along the line 16—16 in FIG. 14.

ROTATION OF THE HOUSING ASSEMBLY 211 AND THE STAR WHEELS 207 AND 217 (FIGS. 14–16)

The rotating assembly or turret 211 includes an upper hub 230 secured to a rotating vertically mounted hollow shaft 231 that is mounted rotatably around the pipe 222. Suitable bearings and fluid seals may be provided along the shaft 231, and the shaft 231 is provided near its lower end with a bevel gear 232, preferably enclosed between the gear housing 224 and the base 221. The gear 232 may be driven by a bevel gear 233 on a drive shaft 234 that lies at right angles to the shaft 231 and is driven by a suitable motor 235, which is the same motor that drives the closing machine P. Thus, rotation of the drive shaft 234 causes rotation of the assembly 211. The drive shaft 234 may also drive the star wheel 207 through gears 236 and 237 and star-wheel shaft 238. Similarly, the star wheel 217 may also be driven from the shaft 234.

The hub 230 has a lower sleeve portion 240 pinned to the shaft 231 and has an upper flange 241. Around the sleeve portion 240 is secured a ring 242 that supports a spider 243. At the outer end of the spider 243 is an annular rim 244 provided with openings 245 in which are seated bushings 246. Inside the bushings 246 short shafts 247 are rotatably mounted, to the upper ends of which are secured container-engaging fingers 250 that engage the containers M and move them around the track 214, each centered beneath a filler outlet spout 215. To the lower end of each shaft 247 is secured a crank arm 251 by which a cam roller 252 is rotatably supported.

The cam rollers 252 engage the cam 228, which is generally circular but has a flattened portion 253 near the filler track outlet 216. The purpose of this portion 253 is to slow the filled cans N down slightly as they approach and move into the outlet 216, to make transfer at this point gentle. At all other points, the fingers 250 are urged firmly against the cans and move them at constant speed. The fingers 250 pick up the cans M from the star wheel 206 and propel them through the filler K between a stationary guide rail 258 and a moving guide ring 259, while maintaining the cans always in alignment with the outlet spouts 215. The cam 228 causes the fingers 250 to yield and relax only after the outlets 215 are closed and as the full cans N approach the filler track outlet 216.

The hub flange 241 supports the filler outlet spouts 215, so that their synchronization with the fingers 250 is assured. It also supports a cup-shaped upper housing 254 that is closed by a sealed cover 255, enclosing a sealed chamber 256. The housing 254 and a block 257 on the flange 241 support each of a set of filling cylinders 260.

THE FILLING CYLINDERS 260 AND THEIR PISTONS (FIGS. 14 AND 15)

The radially mounted cylinders 260, in any suitable number, lie horizontally and symmetrically around a center 261 of the housing 254, about which the assembly 211 rotates. The radially inner end 262 of each cylinder 260 opens into the chamber 256, in which sterile fluid is normally retained during operation. The radially outer end 263 of each cylinder 260 is closed by the block 257 except for an inlet opening 264 and an outlet opening 265, preferably at the top thereof. The inlet opening 264, which is lower than the outlet opening 265, communicates with an inlet conduit 266 in the block 257 that leads down from above into the inlet 264, while an outlet conduit 267 in the block 257 leads down from the outlet 265 toward the outlet 215.

Each cylinder 260 has a piston 270 which reciprocates in it. Preferably, the cylinder 260 and piston 270 are both made of high quality stainless steel honed to enable the use of close tolerances and to prevent undue wear. An O-ring 271 near the outer end of the piston 270 may be used to prevent leakage between the piston 270 and the cylinder 260.

At the opposite end of the piston 270 a wear ring or antifriction ring 272, preferably of Teflon, is provided to prevent scoring or abrasion of the walls of the cylinder 260 and piston 270, which would result if the two metal surfaces moved in contact with each other. This feature is important, for it has been found through extensive experimentation and thorough-going tests that stainless steel or even highly polished chromium-plated surfaces cannot be moved in close contact with each other and in contact with food products without becoming excessively scored and abraded and thereby involving an impracticably high maintenance expense. By this invention the pistons 270 are actually carried on the O-ring 271 at one end and on the Teflon band or strip 272 at the other end. A typical Teflon wear band 272 may be 1/16" thick and 3/8" wide and be inserted in a groove 273, 3/64" deep, located around the skirt end of the piston 270 about 1/8" from its end.

The Teflon band 272 is preferably not in the form of an endless circle, but instead is a strip cut from 1/16" thick Teflon sheet stock 3/8" wide and of length just short of the circumference of the piston 270. The ends of the Teflon band 272 need not be joined closely enough to form a seal—in fact it is better not to have the area between the O-ring 271 and the Teflon band 272 sealed tightly because of the excess pressure which might be exerted on the O-ring 271.

The radially outer end 274 of the piston 270 is preferably concave to prevent it from mashing solid ingredients. It faces the outer end wall 263 of the cylinder 260 and is moved away from it to measure a charge of food product 104 in the cylinder 260 and then is moved toward it to dispense the charge. For this purpose, each piston 270 is attached to a rod 275 by a pin 276 to provide a freely rotatable connection, and all the rods 275 of all the pistons 270 are rotatably connected to respective crank pins 277 in a crank ring 280.

The crank ring 280 is journaled on a stationary crankshaft 281 which is supported in a position eccentric to the center 261 of the rotating structure 211. The strokes of the pistons 270 are identical and are equal to twice the eccentricity of the crankshaft 281. This eccentricity can be adjusted to vary the length of the stroke. For this purpose, the crankshaft 281 is supported in the following manner: at the top of the stationary pipe 222 is mounted a stationary block 282 formed to provide a guide groove 283 in and along which a block 284 can slide. The crankshaft 281 is bolted to the movable block 284. The bottom of the block 284 is provided with a rack 285 that engages a pinion 286 journaled into the stationary block 282 and operated by applying a wrench to the keyed end 287 of a shaft. The block 284 is normally held in a fixed position by a cover plate 288 that is held to the stationary block 282 by bolts 289 and is provided with a slot 290, enabling movement of the crankshaft 281 and block 284 relative to the block 282 and cover plate 288.

With the cover 255 taken off, the bolts 289 can be loosened, and a wrench can be applied to the keyed shaft 287 to move the pinion 286 and therefore the rack 285 and block 284, carrying the crankshaft 281 with it. The block 284 may tend to stick in the groove 283; so a cam 291 may be provided in a groove 292 in the block 282. The cam 291 may be operated by a handle or by a wrench operating on its keyed shaft 293. By thus changing the eccentricity of the stationary crankshaft 281, the filling capacity of the cylinders 260 is changed, because this lengthens or shortens the stroke of the pistons 270 by an amount equal to twice the motion of the block 284.

THE PRODUCT TUBE 200 AND MANIFOLD 300
(FIG. 14)

The food product to be dispensed from the filler K comes via the tube 200 to a manifold 300, which may be rotatably mounted on the end of the tube 200 by means of an antifriction bearing 301, leakage being prevented by an O-ring seal 302. The upper end of the manifold 300 may be a fairly simple sleeve-like fitting 303 surrounding the lower end of the tube 200, while a lower end member 304 of the manifold 300 provides a series of outlet openings 305 that each connect with a filler tube 306, each one of which leads to one of the filler cylinders 260. There are, therefore, exactly as many tubes 306 from the manifold 300 as there are cylinders 260. It may be mentioned that all the connections of the various pipes and fittings are preferably made by using clamps 307 of a well-known type which is easy to sterilize and which, once sterilized interiorly, maintains its sterilization.

THE INLET VALVES 310 (FIGS. 18-20)

Each tube 306 is connected by an elbow 308 to an inlet fitting 309 of an inlet valve 310. The inlet valve 310 is housed in the block 257 and comprises a ball 311 having a through-passage 312 and a control stem 313, which is rotated to turn the ball 311 ninety degrees between an open position and a closed position. The stem 313 extends through a bushing 314, which is provided with one or more O-rings 315 whose sealing action insures the maintenance of sterility inside the valve 310.

The ball 311 is preferably supported between two horizontal Teflon gaskets 316, which are each grooved to receive a synthetic rubber O-ring 317. The O-ring 317 extends beyond the flat surface of the Teflon gasket 316 so as to serve the two-fold purpose of (1) forming a seal between the Teflon gaskets 316 and the flat metal surfaces 320 and 321 respectively, and (2) exerting pressure on the gaskets 316 so that the spherically concave seat of the Teflon gasket 316 will be sealed against the convex surface of the polished metal ball 311. The flat metal surfaces 320 and 321 against which the O-rings 317 seal are ground and polished flat. Clearance is provided between the Teflon gaskets 316 and side walls 322 and 323 at each side of the gaskets 316, and clearance is also provided between the Teflon and the surfaces 320 and 321 so that only the O-rings 317 touch the surfaces 320 and 321. Therefore, the gasket-O-ring assembly can slide over the flat metal surfaces 320 and 321 in between the walls 322 and 323 to provide self-alignment of the gaskets 316 with respect to the ball 311. The ball 311 is thus "floating" between the two gaskets 316, which in turn are slidably positioned between two parallel polished metal retaining surfaces; it is not rigidly supported by the actuating stems 313 or any other element. The O-rings 317 fit tightly into the grooves in the Teflon gaskets with about 1/4 to 1/3 of the O-ring 317 extending above the flat surface of the Teflon. The O-ring 317 is sealed to the Teflon gasket 316 by a close mechanical fit—and if necessary may be cemented to the Teflon by suitable adhesive.

A passage 318 leads from the outlet side of the ball passage 312 to the cylinder inlet conduit 26. Thus, when the valve 310 is open, the food product 104, which may have a liquid phase carrying solid particles, flows freely from the tube 200 through the manifold 300 and tubes 306, the valve 310 and passage 266, into the cylinder 260. There is no place along the path from the tube 200 into the cylinder 260 where the solid particles would be subjected to undue friction or attrition tending to break them down. There is no place at the valve 310 where they can catch, and no way in which they can affect the operation of the valve 310.

Figure 18:
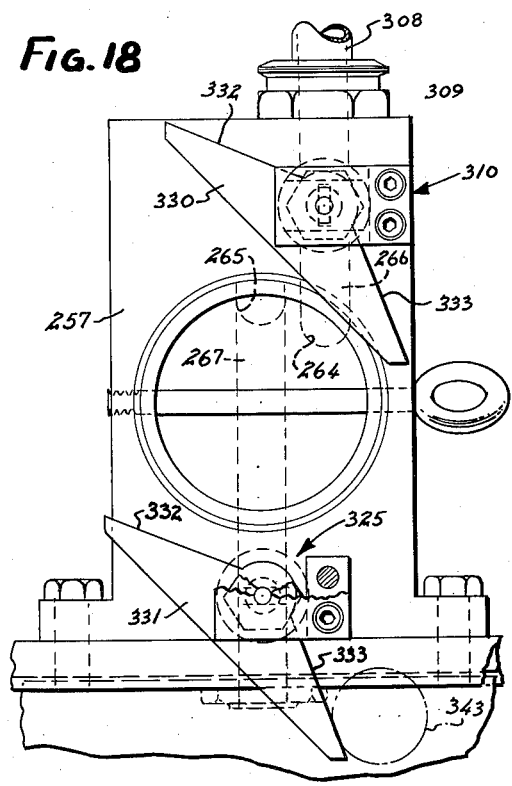
FIG. 18 is an enlarged view in elevation taken along the line 18—18 in FIG. 15 showing one of the ends of the product-filling cylinder and its valves.
Figure 19:
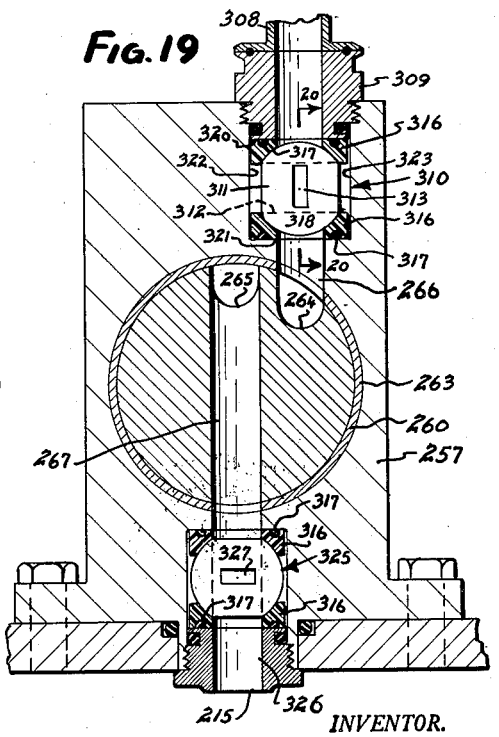
FIG. 19 is a vertical sectional view on the scale of FIG. 18 taken along the line 19—19 in FIG. 15.

The OUTLET VALVE 325 (FIGS. 18-20)

The outlet valve 325 is substantially identical in construction to the valve 310. It is connected by the conduit 267 to the cylinder outlet 265 and by a dispensing passage 326 to the dispensing or outlet opening 215. It has the same type of internal structure as the inlet valve 310 and is rotated by a stem 327 between an open position and a closed position.

OPERATING AND SYNCHRONIZING STRUCTURE
FOR THE VALVES 310 AND 325 (FIG. 17)

The valves 310 and 325 are opened and closed by the same type of structure. Each inlet valve stem 313 has a wedge-like cam 330 mounted on its outer end and each outlet valve stem 327 has a similar cam 331. Each cam or valve trip lever 330, 331 has sloping or curved cam faces 332 and 333. On a pair of the standards 223 that project up from the base 221 of the main frame 210, are mounted brackets 335 which are adjustable both vertically and rotatably by means of set screws 336. Each bracket 335 supports two shafts 337 on each of which is mounted one of four cam-engaging rollers 340, 341, 342, and 343.

The roller 340 is mounted just beyond the empty can inlet 213 to engage the upper cam surface 332 of the inlet valve cam 330 to cause it to rotate the stem 313, thereby moving the inlet valve 310 from an open position to a closed position as the cam 330 passes by the roller 340. Similarly, the roller 341 is mounted near the filled can outlet 216 at a lower altitude than the roller 340 to engage the lower cam face 333 of the inlet valve cam 330 and move the inlet valve 310 from its closed position to its open position.

The roller 342 is like the roller 340 and is mounted just beyond the roller 340 to engage the upper cam surface 332 of the cam 331 to move the outlet valve 325 from its closed position to its open position just after the inlet valve 301 is closed. The roller 343 is, like the roller 341, mounted to engage the lower surface 333 of the outlet valve cam 331 to move the outlet valve 325 from its open position to its closed position just before the inlet valve 310 is opened.

Since the shafts 337 for the cam rollers 341 and 343 are stationary during operation of the device, they are adjusted to a proper position for maintaining synchronization with respect to the stationary crankshaft 281, and this synchronization, once obtained, remains unchanged regardless of the distance from the crankshaft 281 to the center 261. The initial adjustment is readily attained by means of the bracket 335.

The bracket 335 for the rollers 340 and 342 is mounted rigidly on a sleeve 344 that is rotatable on the standard 223, so that both the trip rollers 340 and 342 may be swung outwardly to an inoperative position by a no-can no-fill lever 345 that is also rigidly secured to the sleeve 344. The lever 345 is pivotally joined to a link 346, which in turn is pivotally joined to an arcuate 347. The arm 347 is positioned just below the guide rail 258 and normally parallel to it and is mounted on a pivot 348. A spring 349 urges the arm 347 toward a position in beyond the guide rail 258. As empty cans M are moved onto the track 214 by the star wheel 207 and are carried around on the track 214 by the finger 250, the lower wall of the cans bears against the arm 347 and swings the lever 345 outwardly to move the bracket 335 inwardly toward the valve trip levers 330 and 331. However, if there is no can beneath an outlet 215, the spring 349 swings the rollers 340 and 341 out of the way where they cannot engage the valve trip levers 330 and 331. Thus no product is dispensed from the cylinder 260 unless there is a can beneath the outlet 215, and the movement of the piston 260 merely backs the product temporarily up the pipe 306 and to another cylinder, so that no harm is done. Since the inlet valve 310 is kept open, the incompressible fluid cannot break the cylinder 260 or associated parts. If no cans move into the filler K for a while, the float 183 in the control device G regulates the pump E and metering devices B and C in the manner already described.

THE FILLING CYCLE (FIGS. 15–17)

Figure 17:
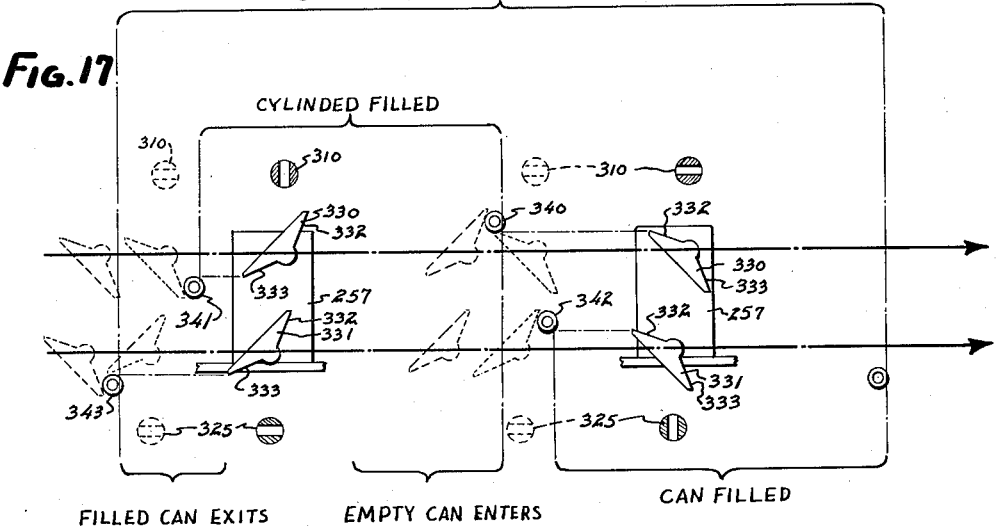
FIG. 17 is a condensed developmental view in elevation corresponding to the path shown in the circle 17—17 in FIG. 15 and illustrating the filling cycle together with the valve-operating cam arrangement.

The filling cycle can best be understood with reference to FIGS. 15 to 17. Starting at the left of FIG. 17, it will be seen that the outlet valve 325 has just been closed, and the can N has just been filled. The cam roller 343, which closed the outlet valve 325, is so located that it engages the cam 331 and closes the outlet valve 325 at the very moment when the piston 270 reaches the outer limit of its stroke. It will be evident that this time is unaffected by the adjustment of the crankshaft 281 toward or away from the center 261. Also, since the cylinder outlet opening 265 is near the top of the cylinder 260, all the material dispensed through the outlet valve 325 is driven there by the piston 270 instead of being able to run out freely as it would if the cylinder outlet opening 265 were located at the bottom of the cylinder 260. Moreover, by having the outlet opening 265 at the top of the cylinder 260, any air or occluded gas in the product 104 is expelled. If, on the other hand, the outlet 265 were at the bottom, accumulated air or gas would not be expelled, but, being under pressure in the cylinder 260, would expand when the outlet valve 325 is opened and the product 104 would spurt out and splash out of the can. Also such accumulated air or gas would affect the accuracy of the fill.

As soon as the roller 343 has caused the cam 331 to close the outlet valve 325, the roller 342 causes the cam 330 to open the inlet valve 310 and permit the flow of food product 104 under pressure into the cylinder 260. At this time the piston 270 has begun to move radially inwardly, and it continues its radially inward stroke until it reaches the inner limit of that stroke, thereby measuring the charge of food. At the very instant when the piston 270 reaches the inner limit of its stroke (crank on dead center), the inlet valve 310 is closed by its cam 330 engaging the roller 340, assuming that an empty can M is below the outlet 215, and a charge of food is therefore accurately measured. During this intake cycle, the piston 270 has been moved only by the action of crankshaft 281 on its rod 275, so that the pressure of the liquid flowing into the cylinder 260 does not affect the piston 270, and similarly, the movement of the piston does not affect the back pressure of the product 104 in the tube 200. Closure of the valve 310 also does not affect the back pressure of the product 104 in the tube 200; so it will be seen how this object of the invention has been achieved, namely, of providing a filling valve that will maintain the back pressure of the food product.

As soon as the inlet valve 310 is closed, the roller 342, by its engagement of the cam 331, causes the outlet valve 325 to open, and the material inside the cylinder 260 is dispensed into the container M by the piston 270. It will be noted that an empty can M entered the inlet cycle at the inlet 213 before the inlet valve 310 was closed, so that it was already in position to receive the contents of the cylinder 260. Moreover, it will be noted that the filled can N exits after the valve 325 is closed, giving a sufficient time for any dripping that may occur, although normally with the ball valves 311 of this invention having the specially designed self-aligning Teflon gaskets 316 with rubber O-rings 318, there is no dripping. The O-rings 317 seal the joint between the Teflon gaskets 316 and metal surfaces 320 and 321 while at the same time exerting the necessary pressure to prevent leakage between the ball valve 311 and the Teflon gaskets 316. Moreover, the outlet valve 325 is intentionally positioned as close as possible to the bottom of the valve block 257, so that the distance from the valve 325 itself to the discharge lip 215 is short and surface drainage is minimized.

MAINTAINING THE STERILITY OF THE ANNULAR CAN-FILLING CHAMBER 212 (FIG. 14)

During their filling, the cans M are maintained in a sterile atmosphere inside the chamber 212 which is defined by the stationary can track 214, a vertical annular wall 350 secured to the can track 214, the rotating flange 241, and a vertical annular wall 351 depending from and secured to the flange 241. The wall 351 is also secured to a flange 352 that is secured to the rim 244. A series of short slots 353 is provided in the wall 351 to permit swinging movement of the fingers 250. Narrow clearances are provided for limited outflow of steam rather than trying to provide rotary seals. Thus, there is a small leakage of sterile gas or steam at the slots 353, more at a clearance 354 between the flange 352 and the can track 214, and at a clearance 355 between the wall 350 and a groove 356 in the flange 341. These clearances help to maintain the filling operation at atmospheric pressure when the steam or other sterile gas is introduced to the chamber 212 from the star wheel chamber 207 and they prevent entry of airborne bacteria into the sterile chamber 212.

STERILITY OF THE CHAMBER 256 DURING OPERATION (FIG. 14)

A sterile fluid such as cool water that has been sterilized or saturated steam is maintained under low pressure in the chamber 256 during operation of the device, and since the food product 104 itself is sterile, this means that at all times the cylinder 260 is in contact only with sterile fluids which are on both sides of the piston 270. The O-ring 271 in the piston 270 prevents dilution of either fluid. Sterile water is preferable to saturated steam when it is desired to fill with the product 104 at 90–110° F., since it will not heat the product. For filling at, say, 190° F., steam would be preferred, since it would not cool the product.

EQUIPMENT FOR STERILIZING THE CHAMBER 256 OF THE FILLER K (FIG. 14)

Inside the pipe 222, a stationary tube 360 goes all the way to the top, where it is threaded to a fitting 361. This pipe 360 serves to supply the chamber 256 and the radially inner end of the cylinders 260 with sterilizing steam at first and, later, sterile water. The pipe 360 is connected by a pipe 362 to a reservoir 363, normally containing sterile water, and having a jacket 364 normally containing cold water, circulated by pipes 365 and 366. An inlet closure valve 367, a drain valve 368 and a drain conduit 369 are also provided. The upper end of the reservoir 363 is connected by a conduit 370 to a suitable source of steam, with controls 371 to maintain the proper temperature and pressure. A bleed valve 372 leads from the bottom of the chamber 256 to free it from condensate during presterilization.

WHAT HAPPENS AFTER THE CANS ARE FILLED (FIG. 1B)

The filled cans N are handled in closed sterilized chambers until they have been sealed. They pass along a conveyor O in a sterilized chamber 380 into the closing machine P. Meanwhile, covers 381 are placed in a suitable storage unit 382 and introduced into a cover sterilizer Q of any desired type. From there the sterile covers 381 pass to the closing machine P. The closing machine P operates in the normal manner of aseptic closing machines to seal the cover 381 tightly on the can N. Since no cooking is to be done later, everything is sterile at this point. All interior surfaces of the closing machine P which may in any way come into contact with either the filled sterile cans N or sterile covers 181 are maintained in a sterile condition by the outward flow of sterile gas or stream. The closing machine P is then provided with an outlet through which steam exits to maintain sterility and through which the sealed cans R pass outside the aseptic canning unit along a conveyer S, whence the cans R go to a washer, labeler, and case packer.

AN ALTERNATIVE FORM OF PRODUCT HEATER 400 (FIGS. 12 AND 13)

Figure 12:
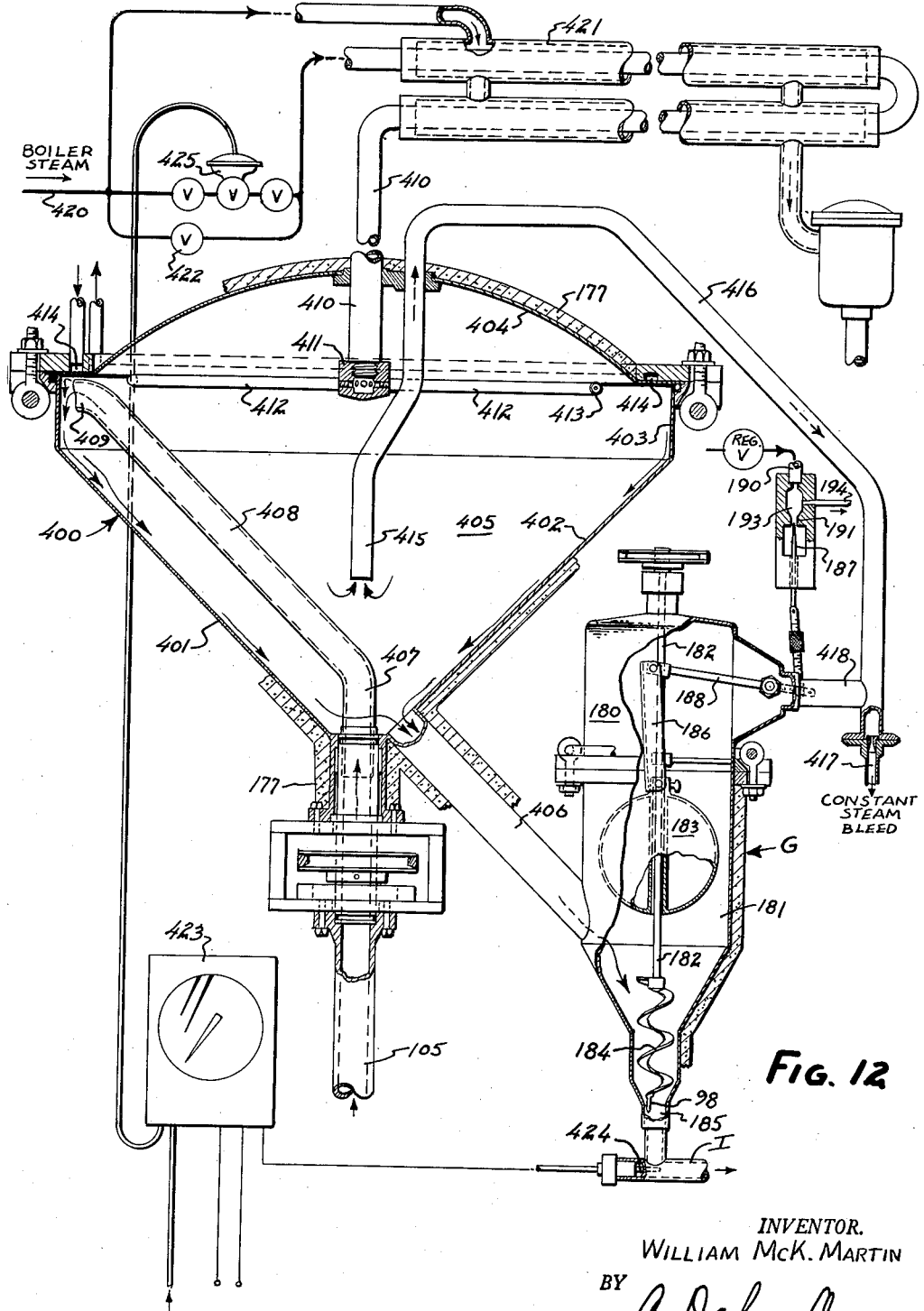
FIG. 12 is a view generally similar to FIG. 8 of a modified form of product heater-sterilizer.
Figure 13:
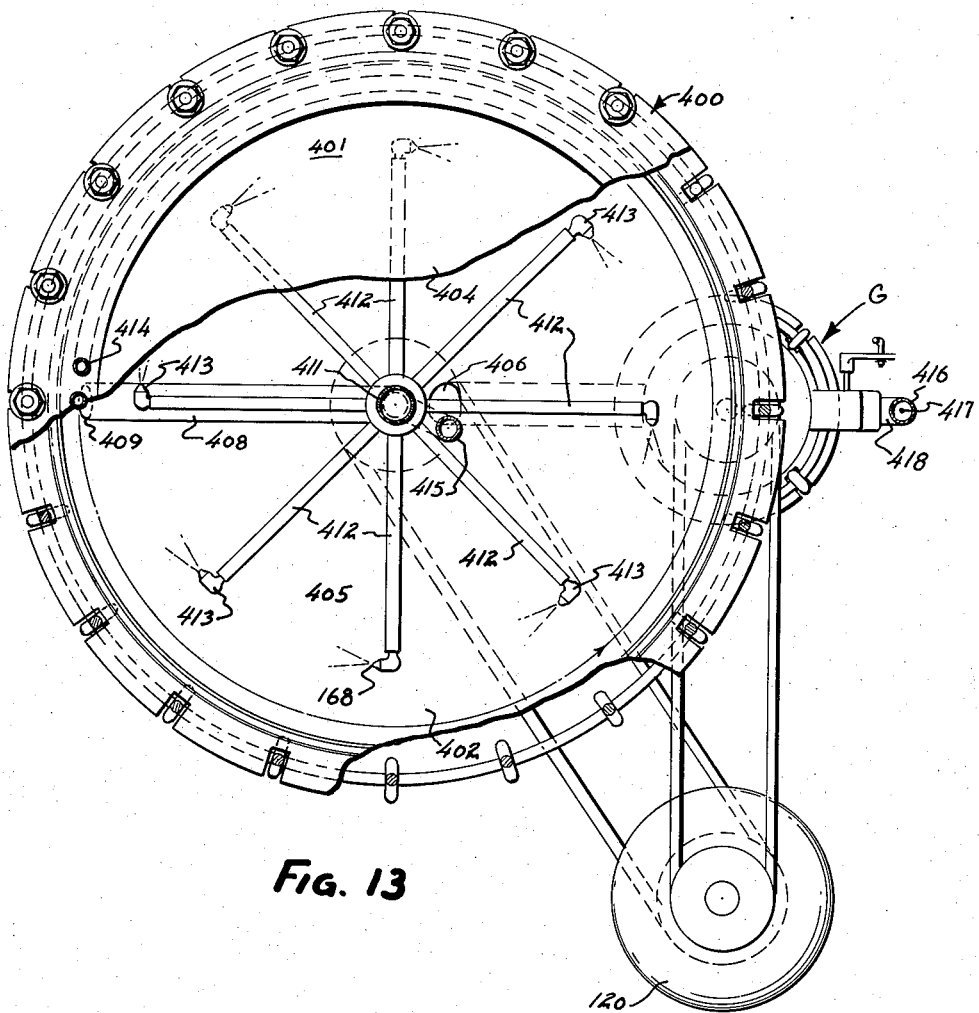
FIG. 13 is a top plan view of the heater of FIG. 12, with portions cut away and shown in section.

To illustrate how the product heater F may be modified, one alternative heater 400 is shown in FIGS. 12 and 13. A housing 401 has a funnel-like lower portion 402, a short cylindrical upper wall 403, and a top closure member 404 defining a heating chamber 405. A product outlet 406 may be the same as the outlet 115, and a rotatable inlet conduit 407 is like the conduit 117, with an upper inclined portion 408 and a spout 409.

The steam however, is heated differently, is introduced differently, is not recirculated, and heats the product principally by latent heat of condensation. A steam inlet conduit 410 leads into a central manifold 411, from which a series of tubes 412 extend out radially. A nozzle 413 at the outer end of each tube 412 directs the steam perpendicularly to the radius and on the plane of the tubes 412, and thereby imparts a whirling motion to the steam. A cooling channel 414 for cold water keeps the boundary cool, as discussed above.

A steam outlet 415 bleeds a small constant amount of the steam out from the center of the chamber 405, sending it by a conduit 416 through a constant steam bleed orifice 417. A pressure equalizing tube 418 connects the conduit 416 to the control device G.

Boiler steam (usually at a temperature of about 350° to 360° F., depending on boiler pressure) comes in through a pipe 420, part of it being diverted to a heating jacket 421 at full boiler pressure and part of it flowing at low pressure through a manually-set valve 422. A temperature controller 423 (like the controller 161) has a temperature-sensing element 424 in the outlet from the control device G and regulates a valve 425 to regulate the steam pressure fed through the jacketed inlet conduit 410. Thus, part of the steam at high boiler pressure is used in the jacket 421 to superheat the remainder of the steam, supplied at regulated lower pressure to the inlet conduit 410.

Figure 8:
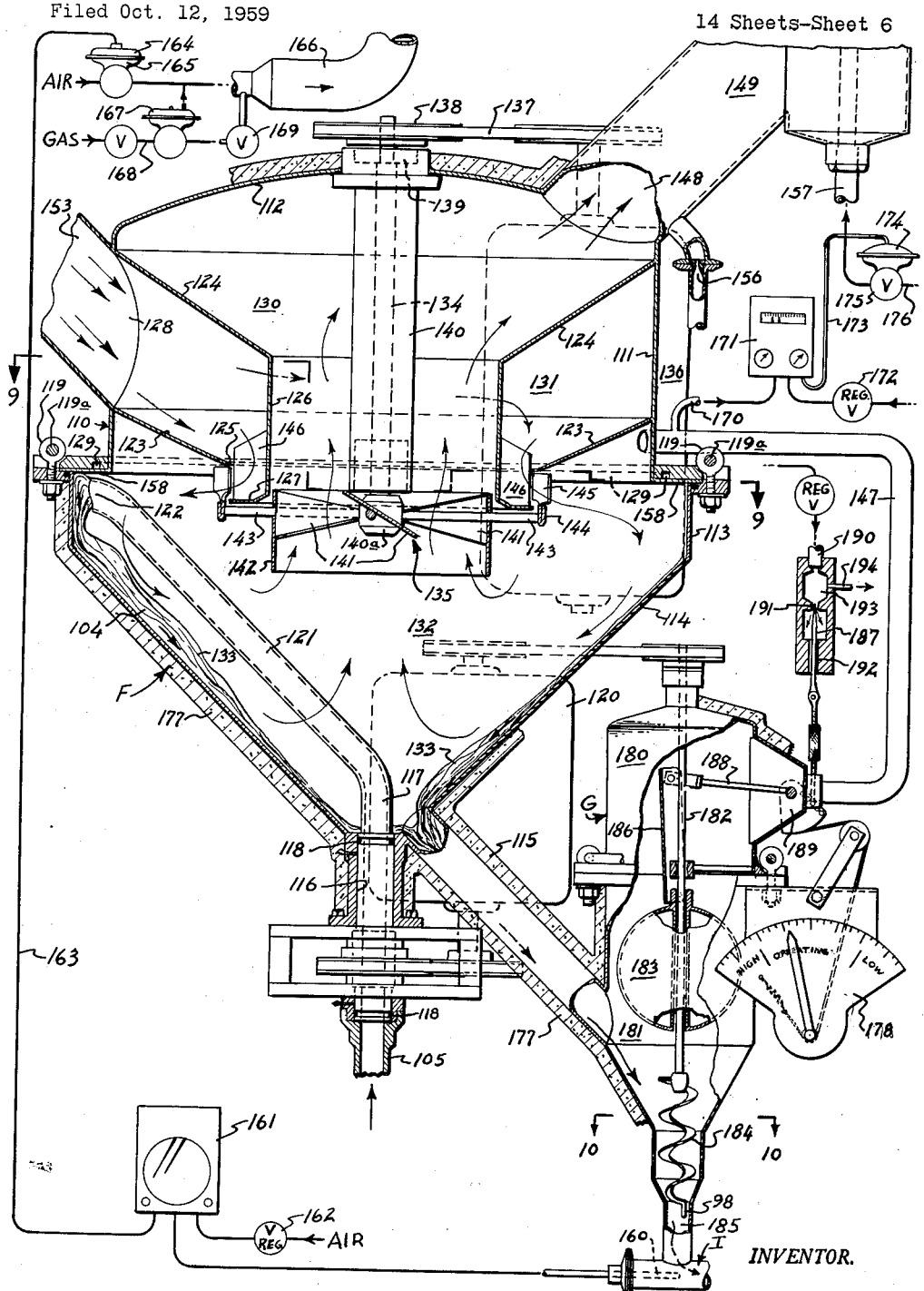
FIG. 8 is a view in elevation and in section, enlarged with respect to FIG. 1A, of a food-heating sterilizer apparatus embodying the principles of this invention. Some of the piping and valves are shown diagrammatically, and some associated elements are shown, partly in elevation and partly broken away and in section.

So far as heating is concerned, the unit in FIGS. 12 and 13 acts in principle very much like that of FIGS. 8 and 9. Whirling steam heats the food at the interface without mixing the steam with the food product. However, with the steam at relatively low temperature (e.g. 350–360° F.) it will mostly condense on the surface of the product and heat it mostly by latent heat of condensation. It thus differs from the use of equilibrium or evaporative conditions that are possible with the heater of FIG. 8. However, though there is condensation and dilution the condensation takes place on the surface of the product wtihout previous intermixture or violent agitation.

OPERATION

*Step 1—Presterilization of the system.*—Before running a food product through the aseptic canning system, that system is first treated so that the pertinent parts thereof are in a sterile condition.

In doing this, no solids are added; i.e., the belt 62 is not operated. The valve 34 is closed to the pipe 33, and tap water is introduced into the system through the pipes 36 and 35, the float chamber 41, the conduit 45, the funnel 90, and the pump E, which sends it into the product heater F through the conduit 105 and the inlet tube 117.

With the steam superheater 150 operating, superheated steam, e.g., at 800–1200° F. and at a pressure of 45–50 p.s.i.g. is sent through the inlet 128 into the housing 110. There the impeller blades 145 and baffles 146 send it whirling out into the chamber 132. There it heats the tap water to about 290–300° F., and then the steam is recirculated by the fan blades 141 through the outlet conduit 148.

The heated water and the steam soon sterilize the interior of the heater housing 110. The hot water, under pressure, flows into the conduit 115 and thence into the float chamber 181, which is kept at the same pressure as the chamber 132 by the tube 147. Thus the conduit 115 and float chamber 181 are sterilized.

At this time the water jacket 197 is empty, its inlet valve 198 being closed and its outlet 199 open to the drain. Hence, the hot water from the heater F courses through the devices I and J, sterilizing them. It continues through the conduit 200 to the valve 201, whence it passes out through the drain conduit 202 and back pressure valve 203, completing sterilization to this point.

Meanwhile a source of superheated steam at between 300° F. and 400° F. is introduced through the conduit 205 and valve 204, sterilizing the other side of the valve 201 and the remainder of the conduit 200. This steam enters the manifold 300 and flows down through the pipes 306 and elbows 308 into the inlet valve 310, sterilizing all these parts. The assembly 211 is being rotated at this time, so that the pistons 270 are moving in their cylinders 260. The no-can no-fill apparatus is disengaged so that the valves 310 and 325 operate as though there were cans on the track 214, and therefore the steam passes through the valves 310 and 325 and the cylinder 260, completing sterilization of that portion of the device. Steam also enters the filling chamber 212 from the chamber 206 as well as from the valves 325 and sterilizes it.

At this time the valve 368 is open; and the water jacket 364 empty. Steam at about 15–20 p.s.i.g. from the conduit 370 passes through the reservoir 363 without condensing and thence flows through the pipes 362 and 360 into the chamber 256, sterilizing the inner ends of the pistons 270 and cylinders 260. Some steam, along with steam condensate formed in the chamber 256, is bled out through a valve 372, the orifice of which is of such size as to discharge all the condensate while at the same time maintaining the steam pressure in the chamber 256 at a level sufficient to maintain a temperature of about 250° F.

*Step 2—Changeover to normal operation.*—After sterilization of the chamber 256 has been assured, the valve 368 is closed and the valve 367 is opened to send cool water into the jacket 364, leaving via the conduit 366. The valve 372 is also closed. Soon the steam condenses in the reservoir 363 and builds up a supply of cool sterile water, which gradually cools off the chamber 256 and fills it with sterile water which is maintained under low pressure (2–5 p.s.i.g.) during subsequent operation by the pressure controller 371.

The sterilization of the entire system including the product heating unit F, the flow-control device G, the temperature-maintaining device I, the cooling means J and the filler K having been completed, cooling water is admitted to the jacket 197 by opening the valve 198, the cooling water usually being recirculated through a valve 373 and conduit 374, with the valve 199 closed. The water flowing continuously under pressure from product heater F through the temperature-maintaining device I will thus be cooled in the cooling device J and discharged through the back-pressure valve 203 and drain conduit 202.

The flow of superheated steam from the conduit 205 is now stopped by closing the valve 204 and changing the three-way valve 201 to cause the cooled sterile water from the cooling device J to flow directly from the tube 200 through the manifold 300 to the plurality of filler tubes 306 and finally into and out of the cylinders 260 through the inlet and outlet valves 310 and 325. The no-can no-fill device 334 may now be made operative, and sterile cans may be introduced into the filler K from the sterilizer L.

Now the valve 34 is turned to send the liquid product 31 from the kettle 30 into the system. The hoppers 60 are already filled with solids, and the screw 66 and belt 62 now carry the solids into the mixer D. At first, as the food pushes out the tap water ahead of it, there is some dilution, so the first few cans R are thrown away.

*Step 3—Normal operation.*—In normal operation, a liquid food component 31, preheated in the kettle 30 to any desired temperature, flows by gravity through the pipe 33, the valve 34, and the pipe 35 into the housing 40. Thence it flows via the conduit 45 and funnel 90 to the pump E. The desired level is maintained by the float 42 and its action on the butterfly valve 54, which closes as the liquid level rises and opens as the liquid level drops.

Meanwhile, solids in the hopper 60, kept from sticking to the walls by the slowly rotating well-spaced pins 74, fall into the metering device 61, where the screw 66 feeds them uphill through a blanching solution or bath 84 of steam. Steam, if used, enters the trough 67 through the orifices 83 in the tube 82; while water other than that condensed from steam can enter through the tube 86 and nozzles 87. The water level is maintained by the opening 88, or if no water bath is desired, the water is drained out as it condenses through the opening 89.

The blanched solid components are metered by the screw 66, whose speed and therefore measure is determined by the speed of the motor H and by the local transmission 81 on each screw drive shaft 77. The measured solids fall through the outlet 68 onto the belt 62 and are carried to the chute 94, whence they fall into the funnel 90.

In the funnel 90, the slowly rotating hollow screw 97 mixes the liquid and solids together, and the tip 98 prevents them from bridging the pump inlet 93. The pump E, operated by the motor H, sends the mixture 104 through the pipe 105 to the rotating inlet tube 117 of the product heater F.

As the mixture 104 pours out from the rotating spout 122, it flows gently down the walls 113 and 114. The spout 122 is rotating at between 30 and 80 r.p.m. so that tender frangible solids are not damaged and so that the walls 113 and 114 are always covered with the food product 104. As it gently flows down the walls 113 and 114, the product 104 is heated by superheated steam that is whirled circularly around in the chamber 132 by the fast-rotating impeller blades 145. The high-temperature superheated steam sweeps the surface of the product mixture without mixing with the product, and heat transfer occurs at the surface. The walls 113 and 114 are at all points cooler than the food product flowing down them; so there is no danger of the food burning on them. The cooling channel 129 is filled with circulating cool water, causing the steam to condense on the wall area 158 and keep the boundary between the steam and the product cool, thereby preventing burn-on at the surface of the wall 158.

The whirling of the superheated steam prevents intermixing of the steam with the product, prevents the food product from spattering on hot metal surfaces of the housing 110 or fan 135, and prevents any of the food product from being entrained with the steam being recirculated through the superheater 150.

The cooled steam, still dry, is expelled by the fan blade 141 into the upper chamber 130 and sent to the superheater 150 by the conduit 148, for reheating and recirculation. The conduit 147 connecting the chamber 132 to the housing 180 keeps the latter at the same pressure as the former.

The heated product 104 leaves the housing 110 substantially without dilution (unless dilution is desired) and may even be somewhat concentrated, if desired. Normally, however, it will leave with exactly the same water content as it had when it entered the heater F.

With the alternative heater 400, the heating process is similar, but the product is diluted by condensate. The steam is given its whirling action by the stationary jet nozzles 413, and the steam is not recirculated.

The heated product (at about 290° F. or within the 275° to 300° F. range) leaves the heater F through the conduit 115 and enters the float chamber 181. Its level here is dependent on the amount of product being dispensed by the filler K and the pumping rate of the pump E. The float 183 follows the product level, and when the float 183 rises or gets lower, it closes or opens the needle valve 187, varying the pneumatic pressure through the tube 194 to the pneumatic amplifier 195. The amplifier 195 controls the motor H to speed it up or slow it down. Variation of the speed of the motor H controls the speed of the pump E and of the metering screws 66 for the solid components of the mixture 104. As the level in the chamber 181 rises, the pump E and screw 66 slow down; when the level falls in the float chamber 181, they speed up. Also, by the effect of the pump speed on the liquid level in the float chamber 41, the valve 54 meters the liquid component. Thus, any change in the filling rate automatically controls the metering of the components into the heater F.

The effect of the metering rate on the heating action, as well as any other heating effect, causes actuation of the temperature controller 161, and countermeasures are instantly taken in the burner 151 to raise or lower the steam temperature to bring it back to the desired level. Thus, all the operations are slaves of the filler K.

From the float chamber 181 the food product flows under the pressure exerted at the chamber 132 through the insulated tube 196 of the temperature-maintaining device I, where the high temperature is prolonged for the few seconds necessary to insure complete sterilization of the product 104.

The sterilized product 104 is then cooled to the desired level (to avoid undesirable chemical effects) in the cooler J and passes to the filler K through the pipe 200. Since the valve 201 is used only during presterilization and since it offers no obstruction to free flow of the mixture 104 during normal operation, the system between the pump E and the filler inlet valves 310 may be considered valveless, as may the system before the pump E.

The cooled sterile product 104 enters the manifold 300 and flows into the pipes 306 to the inlet valves 310. The filler assembly 211 is always rotating; so some inlet valves 310 are open while others are closed, and vice versa; hence the product is always moving out of the pipe 200 and moves intermittently in the pipes 306.

As the assembly 211 rotates, the fingers 250 pick up empty sterile cans M from the star wheel 206 and carry them along the track 214 beneath an outlet spout 215. When any finger 250 fails to pick up a can M, for whatever reason, the no-can no-fill lever 345 is actuated and prevents the rollers 340 and 342 from opening the pertinent outlet valve 325 or closing the pertinent inlet valve 310. Otherwise, the rollers 340 and 342 engage the cams 331 and 330 successively to first close the inlet valve 310 just as the product flowing therethrough has filled the cylinder 260 and then to open the outlet valve 325, so that the piston 270 ejects the product 104 into the can M. Filling continues until the roller 343 closes the outlet valve 325 at the end of the outer stroke of the respective piston 270, the roller 341 immediately thereafter opening the inlet valve 310 to receive another charge of product into the cylinder 260.

Soon after the outlet valve 325 closes, the cam 252 reaches the flat part 253 of the cam track 228, and the finger 250 retracts slightly, slowing down the sterile can N filled with its sterile product, just as it makes the transfer from the track 214 to the outlet star wheel 217. From there, the can N passes by the conveyor O to the closing machine P, where it is closed under sterile conditions. Thence the closed cans R are carried away by the conveyor S.

EXAMPLES OF THE HEATING PROCESS OF THIS INVENTION

In the following examples the various liquids or liquiform products are all heated by direct surface contact with recirculating heated steam, according to the foregoing description of my method and apparatus.

EXAMPLE 1

Seventy pounds of green split peas were added to 30 gallons of vigorously boiling water in a steam-jacketed kettle and the mixture thoroughly cooked until the peas were dispersed to form a pureé or slurry. The volume was then made up to exactly 40 gallons by adding water.

The above slurry was poured by the distributing spout 122 gently down the sloping walls 113 and 114 of the heating chamber 132, while superheated steam was whirled at high velocity within the chamber 132 in contact with the surface of the gently flowing slurry. The steam swept the surface of the gently flowing slurry and gave up to the slurry some of its superheat or specific heat as well as some of its latent heat. Heat transfer was thus across the vapor-liquid interface, part of heat being from the specific heat of the steam and part from latent heat involving condensation. The cooled steam was recirculated through the gas-fired superheater 150 in which it was reheated and re-used in heating the slurry.

The slurry, thus heated almost instantaneously by surface contact with the superheated steam, flowed continuously from the heating chamber 132 through the insulated holding tube I and water-jacketed cooling tube J, and was discharged through a back-pressure pump to the slurry supply kettle 30. The flow of cooling water through the jacket 197 of the cooling tubes J was reduced sufficiently to maintain the temperature of the slurry discharged into the supply kettle 30 to approximately 150° F. to simulate actual processing conditions. The slurry was then recirculated through the closed system continuously for a period of 41 minutes during which the temperatures and flow rates were recorded.

At the end of the test the volume of slurry was carefully measured to determine the amount of steam added to the slurry by condensation during the circulation and recycling of the slurry in the heating operation. It was found to be 51.5 gallons, showing addition of 11.5 gallons of water.

The apparatus was then dismantled and examined for signs or evidence of burn-on on any of the metal parts. No scorching of the slurry nor burn-on was found in any parts of the apparatus, which was substantially that shown in FIG. 8.

The temperatures and flow rates recorded in the tests are presented in Table I.

TABLE I.—SPLIT-PEA SLURRY

| Time, in minutes | Liquid Product (Split-Pea Slurry) | | | | | | Steam | | |
|---|---|---|---|---|---|---|---|---|---|
| | Flow rate, gallons per minute | Initial temperature, °F. | Temperature attained in process, °F. | Holding time after heating, seconds | Holding temperature, °F. | Final temperature, °F. | Pressure, p.s.i.g. | Temperature on entering process chamber, °F. | Temperature on leaving process chamber |
| 10 | 5.6 | 165 | 285 | 45 | 279 | 162 | 59 | 950 | 530 |
| 16 | 5.2 | 158 | 280 | 46 | 280 | 158 | 53 | 940 | 550 |
| 21 | 4.5 | 160 | 278 | 53 | 278 | 149 | 66 | 960 | 560 |
| 25 | 4.2 | 158 | 282 | 57 | 281 | 143 | 66 | 990 | 560 |
| 29 | 5.4 | 155 | 280 | 44 | 281 | 144 | 60 | 930 | 560 |
| 33 | 5.6 | 153 | 278 | 45 | 278 | 135 | 59 | 890 | 555 |
| 37 | 4.1 | 152 | 292 | 59 | 290 | 128 | 66 | 920 | 555 |
| 41 | 4.5 | 146 | 289 | 46 | 288 | 124 | 65 | 920 | 555 |
| Average | 4.9 | 156 | 283 | 49 | 282 | 143 | 63 | 937 | 555 |

There was no burning of the liquid product in this or in the other examples.

As said above, the volume of the liquid product after 41 minutes, at the end of the test, was 51.5 gallons, representing in this instance, net condensation of 11.5 gallons of water from the heating steam. This corresponds to a gain rate of only 3.3% per cycle, which is very little condensation, or about 1.3 gallons per 40 gallon cycle. Even this amount can be eliminated by using hotter steam or more rapid circulation. Under these conditions, where the liquid product weighs approximately 8.5 pounds per gallon and has a specific heat of approximately 1.0, calculations from standard tables show that about 47½% of the heat transfer is by condensation and that about 52½% is transferred by convection.

EXAMPLE 2

To a slurry like that of Example 1, diced potatoes were added. It was then heated to about 150° F. in a kettle. Then it was heated by the method of this invention by superheated steam at about 900° F. to a process temperature of above 295° F., held, and cooled as before. No burning was noted and the amount condensed was again practically negligible.

EXAMPLE 3

The slurry of Example 1 was supplemented by diced potatoes and carrots. At a flow rate of 4.9 gallons per minute, the product was heated according to the invention from about 143° F. to about 280° F. The steam was at a pressure of about 61.5 p.s.i.g., and dropped from about 950° F. to about 550° F. Upon cooling, there had been no burning nor significant condensation of the steam into the product.

EXAMPLE 4

A product substantially the same as that of Example 3 was heated from about 149° F. to about 290° F. under 80 p.s.i.g. steam pressure at about the same temperature as in Example 3. The product was cooled to about 106° F. There was no significant increase in product volume (i.e., no significant condensation of the steam into the product) and no burning of the heated product.

EXAMPLE 5

A product like that of Examples 3 and 4 was heated at a flow rate of about 4.8 gallons per minute from about 156° F. to about 288° F. by steam at a pressure of 82 p.s.i.g. and at an initial temperature of about 880° F., cooling the steam to about 555° F. as it left the heating chamber 132. Again there was no burning and little, if any, condensation.

EXAMPLE 6

Similar satisfactory results were obtained by heating a product similar to that of Examples 3, 4, and 5 at a flow rate of about 4.6 gallons per minute from about 184° F. to about 288° F. by steam at 81 p.s.i.g. and about 952° F., cooling the steam thereby to about 580° F.

EXAMPLE 7

Cream of potato soup containing ⅜″ diced potatoes was similarly treated by steam. The soup, preheated to about 163° F., flowed at a rate of about 4.6 gallons per minute in the novel heat exchanger, where by direct contact (but not mixture) with steam at 645° F., it was heated to about 292° F., cooling the steam to 430° F.

EXAMPLE 8

Cream of chicken soup was processed in a similar manner by preheating it to 174° F., and then flowing it through the heater at 4.7 gallons per minute and contacting it with steam at about 620° F. It was held for 64 seconds at its new temperature of about 286° F. The steam was recirculated through a gas fired superheater, being carried away as its temperature dropped to about 410° F. Again, cooking was done without burning and without significant condensation.

EXAMPLE 9

Ground beef was used to make a hamburger ("beefburger") soup of very thick consistency. The cooking was done by steam in the manner described, by heating the soup from about 185° F. to about 290° F. and holding it at about 290° F. for about one minute. The steam entered at about 660° F. (85 p.s.i.g.) and was withdrawn at about 440° F. and recirculated through a superheater. The results were quite satisfactory.

EXAMPLE 10

Very thick minestrone was heated at a flow rate of 5 gallons per minute from about 146° F. to about 295° F. and held there for about one minute. The steam entered at about 600° F. and left at about 425° F., under about 87 p.s.i.g. Again, there was satisfactory cooking without burning or accumulation of unwanted water.

EXAMPLE 11

Minestrone was canned at the rate of 42 16-oz. cans per minute after being heated from about 147° F. to about 295° F. by steam that entered at 600° F. and left at 420° F. at 86 p.s.i.g. The minestrone was held for about 45 seconds at about 295° F. to get heat penetration into the solid particles; and then the soup was cooled to a satisfactory canning temperature of about 120° F.

EXAMPLE 12

Minestrone soup was canned at the same rate as that of Example 11, being steam heated according to this invention from about 160° F. to about 285° F., held there for 43 seconds, and cooled to about 115° F. The steam was at 83 p.s.i.g. and was cooled in the heater F from about 670° F. to about 430° F.

EXAMPLE 13

A pea soup slurry like that of Example 1 was partially condensed or concentrated, by raising the steam entry temperature to about 1200° F. and by increasing the circulation rate to a value sufficient to transfer all the heat by convection and to evaporate into the steam about 10% of the value of the liquid. This flow rate was easily calculated from standard tables.

EXAMPLE 14

Several hundred canned samples were packed in each of the tests outlined in Examples 7, 8, 9, 11, and 12, and 96 cans from each lot were incubated at 98–100° F. to check sterility. Samples were also submitted to the National Canners Association Laboratory in Berkeley, California, for bacteriological studies. No spoilage occurred in either my own incubation tests or in the N.C.A. studies.

From the foregoing it is clear that the invention comprises an evaporator as well as a heater, and that the volume of liquid in the product may be increased, reduced, or left the same merely by adjustment of the temperature, pressure, and flow rate of the steam relative to the flow rate and initial temperature of the product.

Although steam, usually superheated, has been used throughout as an example and is usually preferred in food processing, other hot gases may be used, such as hot nitrogen or hot helium, and (when oxidation is no problem) hot air. The general term "hot gas" is used in some of the claims to indicate this broad application of the invention.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. An aseptic canning process, comprising: pumping a flowable food product containing solid food particles to a sterilization zone; sterilizing said product in said zone by heating it under pressure above atmospheric to a temperature to in the range of about 275° F. to 300° F., holding it under said pressure above that level for a time sufficient to kill any bacteria present; cooling the resultant sterile product under said pressure; and dispensing said cooled sterile product into sterile containers while maintaining the back pressure on said product up to the time of said dispensing step.

2. The process of claim 1 wherein the dispensing rate controls the pumping rate.

3. A continuous aseptic canning process for food containing large particles, comprising continuously pumping a said food; spreading said pumped food into a moving film; contacting, without intermixture, the surface only of said film with superheated steam under pressure sufficient to prevent its condensation so as to raise the temperature thereof in the range of 275° F. to 300° F. while maintaining all other surfaces of said film in contact with cooler temperature bodies; sterilizing said food at said temperature; cooling said food below its flash temperature at atmospheric pressure; and measuring said food and dispensing it under sterile conditions at atmospheric pressure into sterile containers while holding the back pressure between said contacting step and said measuring step at the point of said measuring step.

4. The process of claim 3 wherein the dispensing rate controls the pumping rate.

5. The process of claim 4 having the step, prior to pumping, of separately metering liquid and solid components into a mixture that comprises the food to be pumped, and wherein the pumping rate controls the metering rate of each component.

6. The process of claim 5, wherein several components are separately metered, the metering rate of each being partly controlled by the pumping rate and partly by individually adjusting each said metering rate.

7. A method for heating a food product, comprising spreading said product into a gently moving film-type stream, and contacting a surface only of said stream with rapidly moving superheated steam, without intermixing said stream with said steam, while maintaining the other surfaces of the stream in contact only with bodies cooler than said stream.

8. A method for heating a mixture of liquid and particulate food, comprising gently moving a thin layer of said mixture while contacting the surface only of said layer with superheated steam, without intermixture of said layer and said steam, said steam being the sole thing said layer is in contact with that is hotter than said mixture.

9. The method of claim 8 wherin a boundary zone on said surface where the steam and mixture meet is continually cooled.

10. A method for heating food to rapid-sterilization temperatures, comprising distributing said food to flow down in the shape of the surface of an inverted cone and contacting the surface only of the downflowing food with rapidly whirling superheated steam as the sole element hotter than said food which the food touches and without intermixture of said steam into said food.

11. A method for heating a liquid food with a hot gas, comprising heating said liquid solely by directly contacting an exposed surface of a thin, moving body of said liquid food with a rapidly moving body of said gas without intermixture of said bodies, while maintaining all other surfaces of said liquid in contact with cooler-temperature bodies.

12. A method for exchanging heat between a hot gas and a cooler liquid food, comprising: moving a continuous thin stream of said liquid food along a defined path with one surface exposed and directing a continuous stream of hot gas against said exposed surface while preventing intermixture of said gas and liquid food and while maintaining all other surfaces of said liquid in contact with cooler-temperature bodies.

13. A method of partially evaporating liquid foods, comprising flowing a liquid food down over a circular area while whirling superheated steam around under centrifugal force radially within said liquid food, so that said steam and liquid food have surface contact, said steam being the only body hotter than said liquid food with which said liquid food is in contact and therefore the sole heating medium for said liquid food, the quantity of circulation of said steam and its temperature being high enough to evaporate some of said liquid food into steam, and carrying all said steam away before it can condense.

References Cited in the file of this patent

UNITED STATES PATENTS

| | | |
|---|---|---|
| 1,252,613 | Phelps | Jan. 8, 1918 |
| 2,028,266 | Anderson | Jan. 21, 1936 |
| 2,268,289 | Kronquest | Dec. 30, 1941 |
| 2,514,027 | Clifcorn et al. | July 4, 1950 |
| 2,549,216 | Martin | Apr. 17, 1951 |
| 2,575,863 | Clifcorn | Nov. 20, 1951 |
| 2,578,732 | Nordquist | Dec. 18, 1951 |
| 2,636,430 | Brown et al. | Apr. 28, 1953 |
| 2,682,827 | Gressly | July 6, 1954 |
| 2,707,096 | Koopmans | Apr. 26, 1955 |
| 2,736,480 | Anderson | Feb. 28, 1956 |
| 2,751,200 | Peters | June 19, 1956 |
| 2,761,603 | Fairchild | Sept. 4, 1956 |
| 2,779,724 | Dunning et al. | Jan. 29, 1957 |
| 2,885,179 | Hartman | May 5, 1959 |
| 2,912,219 | Clade | Nov. 10, 1959 |

UNITED STATES PATENT OFFICE
CERTIFICATE OF CORRECTION

Patent No. 3,041,185                                                June 26, 1962

William McK. Martin

It is hereby certified that error appears in the above numbered patent requiring correction and that the said Letters Patent should read as corrected below.

Column 37, line 17, for "to prevent its condensation" read -- to balance condensation and vaporization and --.

Signed and sealed this 3rd day of December 1963.

(SEAL)
Attest:

ERNEST W. SWIDER
Attesting Officer

EDWIN L. REYNOLDS

Acting Commissioner of Patents